(12) United States Patent
Dal Santo et al.

(10) Patent No.: US 11,363,405 B2
(45) Date of Patent: Jun. 14, 2022

(54) DETERMINING A SIGNIFICANT USER LOCATION FOR PROVIDING LOCATION-BASED SERVICES

(71) Applicant: Apple Inc., Cupertino, CA (US)

(72) Inventors: Michael P. Dal Santo, San Francisco, CA (US); Lukas M. Marti, Santa Clara, CA (US); Ronald K. Huang, San Jose, CA (US); Lili Cao, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/031,634

(22) Filed: Sep. 24, 2020

(65) Prior Publication Data

US 2021/0084437 A1  Mar. 18, 2021

Related U.S. Application Data

(63) Continuation of application No. 16/450,969, filed on Jun. 24, 2019, now Pat. No. 10,791,419, which is a
(Continued)

(51) Int. Cl.
*G06F 9/54* (2006.01)
*H04W 4/021* (2018.01)
(Continued)

(52) U.S. Cl.
CPC .............. *H04W 4/021* (2013.01); *G06F 9/54* (2013.01); *G06Q 10/1095* (2013.01);
(Continued)

(58) Field of Classification Search
CPC ....... H04W 4/021; H04W 4/04; H04W 4/028; H04W 4/027; G06Q 10/1095;
(Continued)

(56) References Cited

U.S. PATENT DOCUMENTS 6,138,026 A   10/2000  Irvin
6,374,176 B1   4/2002  Schmier et al.
(Continued)

FOREIGN PATENT DOCUMENTS

CN       1486576      3/2004
CN     101438580      5/2009
(Continued)

OTHER PUBLICATIONS

International Search Report in International Application No. PCT/US2015/015014, dated May 11, 2015, 14 pages.
(Continued)

*Primary Examiner* — Chuong A Ngo
(74) *Attorney, Agent, or Firm* — Aikin & Gallant, LLP

(57) ABSTRACT

Systems, methods, and program products for providing services to a user by a mobile device based on the user's daily routine of movement. The mobile device determines whether a location cluster indicates a significant location for the user based on one or more hints that indicate an interest of the user in locations in the cluster. The mobile device can perform adaptive clustering to determine a size of area of the significant location based on how multiple locations converge in the location cluster. The mobile device can provide location-based services for calendar items, including predicting a time of arrival at an estimated location of a calendar item. The mobile device can provide various services related to a location of the mobile device or a significant location of the user through an application programming interface (API).

20 Claims, 19 Drawing Sheets

Related U.S. Application Data continuation of application No. 15/475,725, filed on Mar. 31, 2017, now Pat. No. 10,362,440, which is a continuation of application No. 14/502,385, filed on Sep. 30, 2014, now Pat. No. 9,615,202.

(60) Provisional application No. 62/005,897, filed on May 30, 2014.

(51) Int. Cl.
| | |
|---|---|
| H04W 4/029 | (2018.01) |
| H04W 4/024 | (2018.01) |
| H04M 1/72451 | (2021.01) |
| H04M 1/72457 | (2021.01) |
| G06Q 10/10 | (2012.01) |
| H04L 67/52 | (2022.01) |
| H04L 67/55 | (2022.01) |
| H04W 4/02 | (2018.01) |
| H04W 4/30 | (2018.01) |

(52) U.S. Cl.
CPC ............. *H04L 67/18* (2013.01); *H04L 67/26* (2013.01); *H04M 1/72451* (2021.01); *H04M 1/72457* (2021.01); *H04W 4/024* (2018.02); *H04W 4/027* (2013.01); *H04W 4/029* (2018.02); *H04W 4/30* (2018.02)

(58) Field of Classification Search
CPC .......... H04M 1/72566; H04M 1/72572; H04L 67/26; H04L 67/18; G06F 9/54; H01R 13/629; H05K 5/0247; B60R 16/0238; H02G 3/086
See application file for complete search history.

(56) References Cited

U.S. PATENT DOCUMENTS

| | | | |
|---|---|---|---|
| 6,477,462 | B1 | 11/2002 | Rychlak |
| 6,889,138 | B1 | 5/2005 | Krull et al. |
| 7,571,050 | B2 | 8/2009 | Liebling |
| 8,090,393 | B1 | 1/2012 | Emigh et al. |
| 8,102,255 | B1 | 1/2012 | Emigh |
| 8,138,907 | B2 | 3/2012 | Barbeau et al. |
| 8,188,859 | B1 | 5/2012 | Emigh |
| 8,299,915 | B1 | 10/2012 | Emigh |
| 8,385,944 | B1 | 2/2013 | Nelissen |
| 8,577,332 | B1 | 11/2013 | Quint et al. |
| 8,797,156 | B1 | 8/2014 | Emigh |
| 8,990,107 | B2 | 3/2015 | Liang et al. |
| 9,046,375 | B1 | 6/2015 | Emigh |
| 9,076,009 | B2 | 7/2015 | Sathish et al. |
| 9,194,717 | B2 | 11/2015 | Jouaux et al. |
| 9,243,911 | B2 | 1/2016 | Coughlin et al. |
| 9,267,805 | B2 | 2/2016 | Marti et al. |
| 9,285,231 | B2 | 3/2016 | Jouaux et al. |
| 9,615,202 | B2 | 4/2017 | Dal Santo et al. |
| 9,778,345 | B2 | 10/2017 | Jouaux et al. |
| 9,807,565 | B2 | 10/2017 | Marti et al. |
| 9,843,894 | B2 | 12/2017 | Dal Santo et al. |
| 9,843,895 | B2 | 12/2017 | Dal Santo et al. |
| 10,111,042 | B2 | 10/2018 | Marti et al. |
| 10,362,440 | B2 | 7/2019 | Dal Santo et al. |
| 10,375,515 | B2 | 8/2019 | Dal Santo et al. |
| 10,791,419 | B2 | 9/2020 | Dal Santo et al. |
| 2002/0069017 | A1 | 6/2002 | Schmier et al. |
| 2002/0161587 | A1 | 10/2002 | Pitts |
| 2003/0014181 | A1 | 1/2003 | Myr |
| 2003/0137435 | A1 | 7/2003 | Haddad et al. |
| 2003/0148771 | A1 | 8/2003 | De Verteuil |
| 2004/0088104 | A1 | 5/2004 | Izbicki et al. |
| 2005/0258980 | A1 | 11/2005 | Conover |
| 2006/0009905 | A1 | 1/2006 | Soderberg et al. |
| 2006/0164259 | A1 | 7/2006 | Winkler et al. |
| 2006/0173618 | A1 | 8/2006 | Eyer et al. |
| 2007/0016553 | A1 | 1/2007 | Dumals |
| 2007/0024440 | A1 | 2/2007 | Moran et al. |
| 2007/0149214 | A1 | 6/2007 | Walsh et al. |
| 2007/0191029 | A1 | 8/2007 | Zarem et al. |
| 2008/0001276 | A1 | 1/2008 | Lee et al. |
| 2008/0007399 | A1 | 1/2008 | Hart |
| 2008/0012761 | A1 | 1/2008 | Derrick et al. |
| 2008/0255758 | A1 | 10/2008 | Graham et al. |
| 2009/0196267 | A1 | 8/2009 | Walker, Sr. |
| 2010/0106603 | A1 | 4/2010 | Dey et al. |
| 2010/0183134 | A1 | 7/2010 | Vendrow et al. |
| 2010/0197325 | A1 | 8/2010 | Dredge |
| 2010/0225447 | A1 | 9/2010 | Adra |
| 2010/0268450 | A1 | 10/2010 | Evanitsky |
| 2010/0287178 | A1 | 11/2010 | Lambert et al. |
| 2010/0304756 | A1 | 12/2010 | Yang |
| 2011/0029465 | A1 | 2/2011 | Ito et al. |
| 2011/0046881 | A1 | 2/2011 | Karaoguz |
| 2011/0070863 | A1 | 3/2011 | Ma et al. |
| 2011/0070865 | A1 | 3/2011 | Nelson et al. |
| 2011/0071881 | A1 | 3/2011 | Zheng et al. |
| 2011/0072020 | A1 | 3/2011 | Ngo et al. |
| 2011/0137834 | A1 | 6/2011 | Ide et al. |
| 2011/0184768 | A1 | 7/2011 | Norton et al. |
| 2011/0195727 | A1 | 8/2011 | Proulx et al. |
| 2011/0219328 | A1 | 9/2011 | Ilvessalmi et al. |
| 2011/0313956 | A1 | 12/2011 | Abe et al. |
| 2012/0052871 | A1 | 3/2012 | Cochran |
| 2012/0058782 | A1 | 3/2012 | Li |
| 2012/0088525 | A1* | 4/2012 | Kurokawa ............ H04W 4/029 455/456.5 |
| 2012/0108259 | A1* | 5/2012 | Weiss ................. G06Q 30/0267 455/456.1 |
| 2012/0122407 | A1 | 5/2012 | Alpress et al. |
| 2012/0131066 | A1 | 5/2012 | Jain |
| 2012/0149394 | A1 | 6/2012 | Singh et al. |
| 2012/0149415 | A1 | 6/2012 | Valaee et al. |
| 2012/0182933 | A1 | 7/2012 | Bandhakavi et al. |
| 2013/0066548 | A1 | 3/2013 | Gruen et al. |
| 2013/0159234 | A1 | 6/2013 | Xing et al. |
| 2013/0252633 | A1 | 9/2013 | Liang |
| 2013/0252638 | A1* | 9/2013 | Yang .................... H04W 4/029 455/456.3 |
| 2013/0315042 | A1 | 11/2013 | Kindel |
| 2014/0058778 | A1 | 2/2014 | Mclarty et al. |
| 2014/0094199 | A1 | 4/2014 | Palanki et al. |
| 2014/0099921 | A1 | 4/2014 | Weiss |
| 2014/0141808 | A1 | 5/2014 | Deng |
| 2014/0162693 | A1 | 6/2014 | Wachter et al. |
| 2014/0164358 | A1 | 6/2014 | Benzatti |
| 2014/0171013 | A1 | 6/2014 | Varoglu et al. |
| 2014/0197967 | A1 | 7/2014 | Modica et al. |
| 2014/0229099 | A1 | 8/2014 | Garrett et al. |
| 2014/0288821 | A1 | 9/2014 | Modica et al. |
| 2014/0364149 | A1 | 12/2014 | Marti et al. |
| 2014/0364150 | A1 | 12/2014 | Marti et al. |
| 2014/0372904 | A1 | 12/2014 | Liu et al. |
| 2015/0031397 | A1 | 1/2015 | Jouaux et al. |
| 2015/0073702 | A1 | 3/2015 | Jouaux et al. |
| 2015/0073703 | A1 | 3/2015 | Jouaux et al. |
| 2015/0087264 | A1 | 3/2015 | Goyal |
| 2015/0199380 | A1 | 7/2015 | Avramova et al. |
| 2015/0201307 | A1 | 7/2015 | Dishneau |
| 2015/0237470 | A1 | 8/2015 | Mayor |
| 2015/0304437 | A1 | 10/2015 | Vaccari |
| 2015/0350828 | A1 | 12/2015 | Marti et al. |
| 2015/0350841 | A1 | 12/2015 | Dal Santo et al. |
| 2015/0350842 | A1 | 12/2015 | Huang et al. |
| 2015/0350843 | A1 | 12/2015 | Jensen et al. |
| 2016/0003637 | A1 | 1/2016 | Andersen |
| 2016/0238693 | A1 | 8/2016 | Jouaux et al. |

FOREIGN PATENT DOCUMENTS

| | | |
|---|---|---|
| CN | 101989127 A | 3/2011 |
| CN | 102087722 A | 6/2011 |
| CN | 102298608 A | 12/2011 |
| CN | 102577158 A | 7/2012 |

(56) References Cited

FOREIGN PATENT DOCUMENTS

| | | | |
|---|---|---|---|
| CN | 102577443 | A | 7/2012 |
| CN | 104067305 | | 9/2014 |
| EP | 1501321 | A2 | 1/2005 |
| EP | 2284768 | A2 | 2/2011 |
| WO | 2002089089 | A1 | 11/2002 |
| WO | 2007089087 | A1 | 8/2007 |
| WO | 2012038781 | A1 | 3/2012 |
| WO | 2013024276 | | 2/2013 |
| WO | 2013024279 | A1 | 2/2013 |

OTHER PUBLICATIONS

International Search Report and Written Opinion in International Application No. PCT/US2015/033049, dated Dec. 1, 2015, 23 pages.
Invitation to Pay Additional Fees and, Where Applicable, Protest Fees, International Application No. PCT/US2015/033049, mailed Aug. 12, 2015, 6 pages.
Korean Intellectual Property Office Notice of Preliminary Rejection for Application No. 10-2016-7021591, dated May 22, 2017, 13 pages.
Daniel Kelly et al: "Uncovering Measurements of Social and Demographic Behavior From Smartphone Location Data", https://www.researchgate.net/journal/IEEE-Transactions-on-Systems-Man-and-Cybernetics-Part-A-Systems-and-Humans-1083-4427, vol. 43, No. 2, Mar. 2013 (Mar. 2013), pp. 188-198, XP011493864, ISSN: 2168-2291, DOI: 10.1109ArSMC.2013.2238926.

* cited by examiner

DETERMINING A SIGNIFICANT USER LOCATION FOR PROVIDING LOCATION-BASED SERVICES

CROSS REFERENCE TO RELATED APPLICATIONS

This application is a continuation of and claims priority to U.S. patent application Ser. No. 16/450,969, filed Jun. 24, 2019, which is a continuation of U.S. patent application Ser. No. 15/475,725, filed Mar. 31, 2017, which is a continuation of U.S. patent application Ser. No. 14/502,385, filed Sep. 30, 2014, now issued as U.S. Pat. No. 9,615,202 on Apr. 4, 2017, which is a non-provisional of and claims priority to U.S. Provisional Patent Application No. 62/005,897, filed on May 30, 2014, the entire contents of both of which are hereby incorporated by reference.

TECHNICAL FIELD

This disclosure relates generally to location-based services.

BACKGROUND

Many electronic devices have location-based functions. For example, a mobile device can estimate a location of the mobile device using a satellite navigation system (e.g., global positioning system or GPS) or a cellular communications system. The mobile device can perform various tasks that are location specific. For example, a map application executing on the mobile device can cause the mobile device to display a map. A marker on the map can indicate a current location of the mobile device. Upon receiving a user input selecting the marker, the mobile device can display points of interests, e.g., restaurants or gas stations, that are close to the current location. Upon receiving a user input specifying a destination, the mobile device can display a route from the current location to the destination, and an estimated time of arrival based on traffic information on the route.

SUMMARY

Techniques for determining a location significant to a user for providing location-based services are described. A significant user location is a geographic location that is determined to have a significant meaning to a user of a mobile device such that the user is likely to visit the location in the future. The mobile device can determine that a geographic location is a significant user location based on how long the user has dwelled at the geographic location. The length of time for determining a significant location can be hint based. A hint can be a historical or present action performed on the mobile device or detected by the mobile device that indicates that the user may have an interest at the location. Upon detecting a hint, the mobile device can reduce a pre-specified threshold time for determining a significant location.

Techniques for adaptive location clustering are described. A mobile device can determine a size of a location cluster indicating a location that is significant to a user. For a pre-specified period of time, the mobile device can record locations, and determine a convergence rate of the recorded location. The convergence rate can indicate how quickly the locations are clustered together. A higher convergence rate corresponds to a smaller size. The mobile device can measure a deviation over a given convergence rate. The mobile device can store the location cluster in association with the size. The mobile device can determine a significant location based on locations in the location cluster and a size of the location cluster.

Techniques for determining a location of a calendar item are described. A mobile device can receive a calendar item including a description and a time. The mobile device can determine that, at the time specified in the calendar item, the mobile device is located at a location that is estimated to be significant to a user. The mobile device can store the description in association with the significant location. Upon receiving a new calendar item containing at least one term in the description, the mobile device can predict that the user will visit the significant location at the time specified in the new calendar item. The mobile device can provide user assistance based on the prediction.

Techniques for determining a location of a mobile device using a location application programming interface (API) are described. A mobile device can receive an input requesting the mobile device to monitor entry into and exit from a significant location. The mobile device can call a start-monitoring instance function of an object of a location manager class as declared in the API to start monitoring, and call a stop-monitoring instance function of the object as declared in the API to stop monitoring. The mobile device can store the entry and exit, or provide a record of the entry or exit to a function that is conformant to the API for performing various tasks.

The features described in this specification can be implemented to achieve one or more advantages. A mobile device can learn a movement pattern of the mobile device, and adapt itself to that movement pattern. The mobile device can provide predictive user assistance based on the movement pattern without requiring additional user input, including, for example, alerting the user of traffic conditions while the user is en route to a significant location if the mobile device determines, based on past movement patterns of the mobile device, that a user will visit the significant location, even when the mobile device did not receive a user inquiry. Accordingly, a user of the mobile device may have a better experience using services, especially location-based services, of the mobile device. For example, the mobile device can determine that a user usually goes from home to work at 8:00 am on weekdays and from home to a gymnasium at 8:00 am on weekends. Upon being turned on shortly before 8:00 am, on weekdays, the mobile device can automatically display traffic information on a route from home to work; whereas on weekends, the mobile device can automatically display traffic information on a route from home to the gymnasium.

The details of one or more implementations of the subject matter are set forth in the accompanying drawings and the description below. Other features, aspects, and advantages of subject matter will become apparent from the description, the drawings, and the claims.

BRIEF DESCRIPTION OF THE DRAWINGS

Like reference symbols in the various drawings indicate like elements.

DETAILED DESCRIPTION

Exemplary Predictive User Assistance

Figure 1:
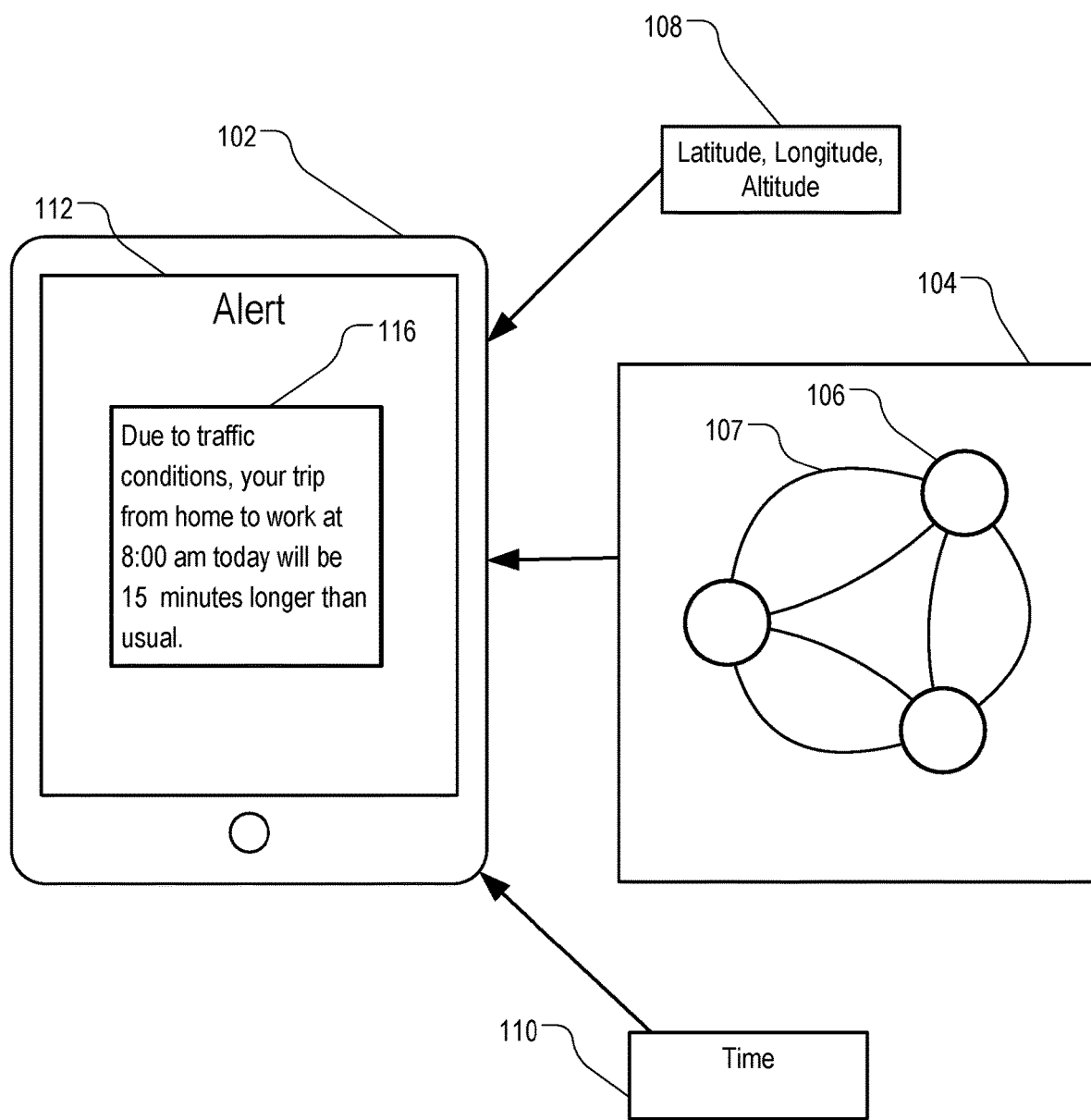
FIG. 1 is a diagram illustrating an exemplary implementation of predictive user assistance.

FIG. 1 is a diagram illustrating an exemplary implementation of predictive user assistance. Exemplary mobile device 102 can utilize past movements of mobile device 102 to predict a future location of mobile device 102. Mobile device 102 can then adapt behavior of mobile device 102 to perform services that are specific to the predicted future location.

Mobile device 102 can use machine learning and data mining techniques to learn the past movement of mobile device 102. The past movement can be recorded as significant locations visited by mobile device 102 and movement of mobile device 102 between the significant locations. Mobile device 102 can determine that a place or region is a significant location upon determining that, with sufficient certainty, mobile device 102 has stayed at the place or region for a sufficient amount of time. The amount of time can be sufficient if it satisfies various criteria, for example, when the amount of time satisfies a time length threshold (e.g., X hours) or a frequency threshold (e.g., X minutes per day, Y number of days per week). Records of movement of mobile device 102 can include a measured or calculated time of entry into each significant location and a measured or calculated time of exit from each significant location. A significant location can be associated with multiple entries and exits.

In addition to significant locations, the records of movement can include transitions between the significant locations. Each transition from a first significant location to a second significant location can be associated with a transition begin timestamp indicating a time mobile device 102 leaves the first significant location and a transition end timestamp indicating a time mobile device 102 enters the second significant location.

Mobile device 102 can represent the records of movement as state model 104. State model 104 can include states (e.g., state 106 and other states) each representing a significant location, and transitions (e.g., transition 107 and other transition between the states) each representing a movement of mobile device 102 between significant locations. Additional details of determining state model 104 are described below in reference to FIG. 2-5.

Based on state model 104, mobile device 102 can determine (1) a transition probability density that, at a given time, mobile device 102 moves from a given significant location to each other significant location, or (2) an entry probability density that mobile device 102 enters a significant location from a previously unknown or unrepresented location. A pattern analyzer of mobile device 102 can determine a daily, weekly, monthly, or annual movement pattern of mobile device 102 using state model 104. A predictive engine of mobile device 102 can use transition probability density (or entry probability density) and the movement pattern to forecast a significant location that mobile device 102 will enter (or stay) at a future time. Mobile device 102 can then use the forecast to provide predictive user assistance, e.g., to assist the user to plan for a future event.

In the example of FIG. 1, mobile device 102 can determine current location 108 using a location determination subsystem of mobile device 102. Mobile device 102 can determine current time 110. Based on the current location, current time, and the probabilities and patterns of state model 104, mobile device 102 can determine that a most likely location of mobile device 102 at a given time in the future is a significant location represented by state 106. Mobile device 102 can then perform a user-assistance function corresponding to the significant location, or corresponding to a transition from the current location to the significant location. For example, upon being turned on or unlocked, mobile device 102 can provide for display alert 112 on a display surface of mobile device 102. Alert 112 can include user assistance information 116. User assistance information 116 can include, for example, a route from the current location to the likely future location, and traffic information along the route. Mobile device 102 can provide for display alert 112 and user assistance information 116 automatically, without requesting a user to input the likely future location as a destination.

In some implementations, mobile device 102 can provide a label associated with the likely future location. The label can be an address or a name of a point of interest prespecified by a user or determined by mobile device 102 through reverse geocoding or through semantic analysis of movements of mobile device 102. For example, mobile device 102 can determine that a first location is likely to be a home and a second location is likely to be a work place. Accordingly, mobile device 102 can use the terms "home" and "work" in user assistance information 116.

Exemplary Techniques of Constructing a State Model

Figure 2A:
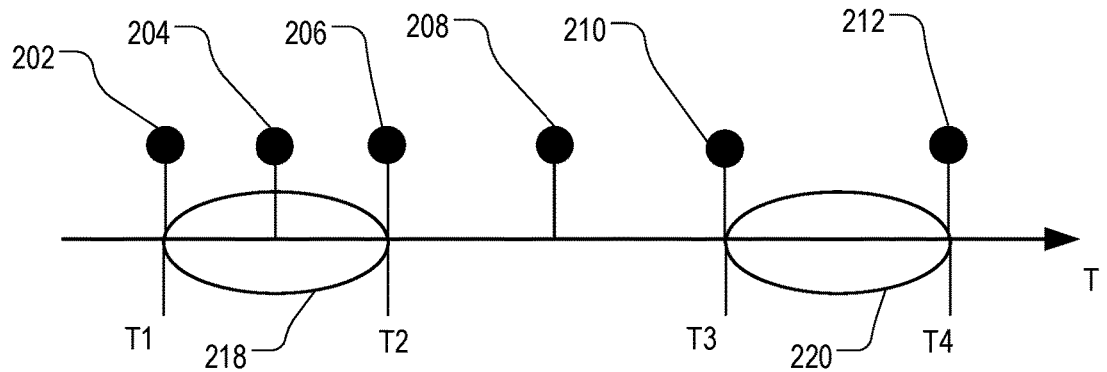
FIG. 2A is a diagram illustrating exemplary techniques of determining location clusters.

FIG. 2A is a diagram illustrating exemplary techniques of determining location clusters. Exemplary mobile device 102 (of FIG. 1) can use the learning techniques to determine state model 104 (of FIG. 1).

Mobile device 102 can sequentially trace location data through time (T). Sequentially tracing location data can be performed by piggybacking on another application to avoid or reduce cost of location data collection. For example, mobile device 102 can collect the location data when another service requests location from a location determination subsystem of mobile device 102. Accordingly, collecting the location data can be "free" without having to activate the location determination subsystem solely for determining a movement pattern of mobile device 102.

Mobile device 102 can collect locations 202, 204, 206, 208, 210, and 212 over time T. Collecting the locations can be on-going operations. Locations older than a specified period can be purged. The period can be specified by user preference or privacy policies. Locations 202, 204, 206, 208, 210, and 212 can each include latitude, longitude, and altitude coordinates and being associated with a timestamp indicating a time the corresponding location is collected.

Mobile device 102 can determine that some of locations 202, 204, 206, 208, 210, and 212 belong to location clusters that may indicate a significant location. Mobile device 102 can determine that a location cluster is formed upon determining that (1) at least a pre-specified threshold number (e.g., two) of consecutive locations are collected; (2) a time span of the consecutive locations satisfies a pre-specified threshold time window; and (3) these locations are identical, indicating that mobile device 102 is stationary, or sufficiently close to one another, indicating that mobile device 102 is located in a sufficiently small and defined area during the time the locations are collected.

For example, mobile device 102 can determine two location clusters, location cluster 218 and location cluster 220, over time T. Location cluster 218 can include locations 202, 204, and 206, which are collected over a time period [T1, T2] that is longer than a threshold time window (e.g., a time window of 45 minutes). Mobile device 102 can determine that location cluster 218 includes locations 202, 204, and 206 upon determining that a variance of locations 202, 204, and 206 is low enough to satisfy a variance threshold. Likewise, location cluster 220 can include locations 210 and 212, which are collected within time period [T3, T4]. Mobile device 102 can determine that location cluster 220 includes locations 210 and 212 upon determining that a variance of locations 210 and 212 satisfies the variance threshold.

An outlier detection mechanism can filter out locations that do not belong to clusters. For example, mobile device 102 can determine that location 208 is different from location 206 and location 210 (e.g., the distance between location 206 and 208 and the distance between location 208 and location 210 exceeds a threshold). In addition, mobile device 102 can determine that no other locations are (1) collected within the threshold time window before or after location 208 and (2) geographically close to location 208. In response, mobile device 102 can determine that location 208 is an outlier and discard location 208. In addition, if a location in a time period is significantly different from many other locations in the time period, mobile device 102 can discard the different location as an outlier and determine the location cluster using other locations in the time window. Mobile device 102 can use location clusters 218 and 220 to determine significant locations and states of state model 104.

Figure 2B:
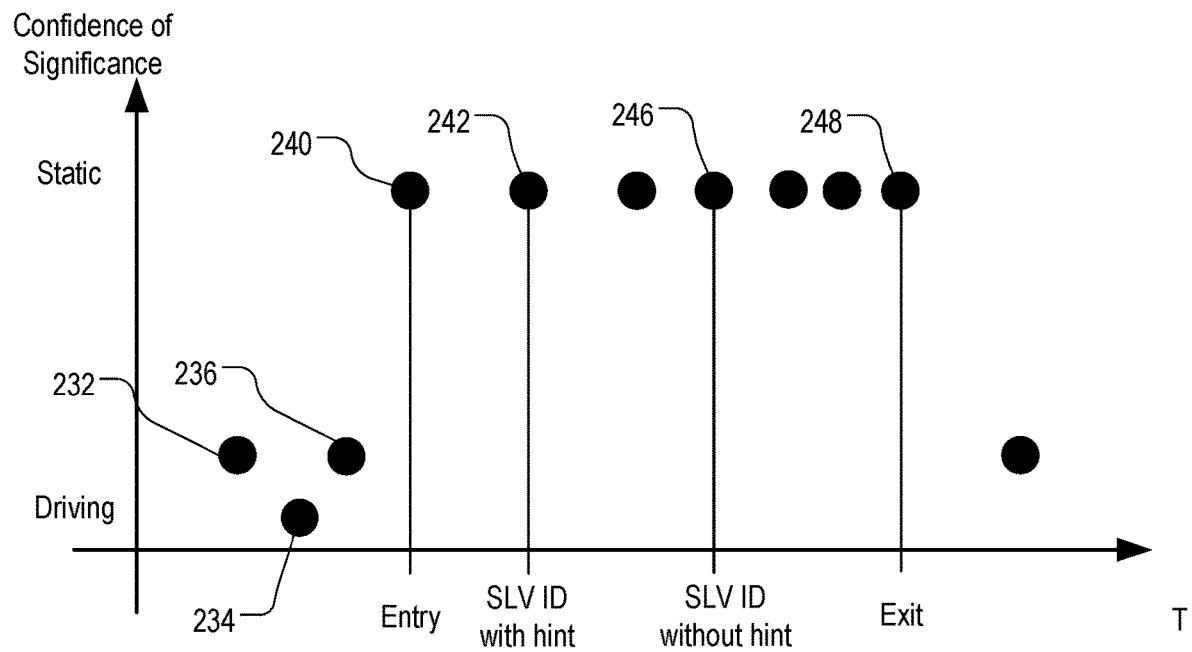
FIG. 2B is a diagram illustrating exemplary techniques of hint-based location clusters.

FIG. 2B is a diagram illustrating exemplary techniques of hint-based location clusters. In some implementations, one of the conditions for determining a location cluster is that a time span of the consecutive locations satisfies a variable threshold time window. The threshold can vary based on whether mobile device 102 has a hint of significance of a location.

At various times, mobile device 102 can be located at locations 232, 234, and 236. Locations 232, 234, and 236 can be far apart from one another, indicating that mobile device 102 is moving. Mobile device 102 can be located at locations 240 through 248 during a continuous period of time. Locations 240 through 248 can be identical or sufficiently close to one another. Mobile device 102 can determine whether the period of time is sufficiently long such that locations 240 through 248 form a location cluster that indicates a significant location, based on whether the period of time satisfies a variable threshold. Mobile device 102 can use various hints to determine the variable threshold.

For example, mobile device 102 can search locations where mobile device 102 visited previously. Mobile device 102 can designate as a first hint a record indicating that mobile device 102 previously visited the location at or near locations 240 through 248 as a first hint. Mobile device 102 can examine a user search history performed on or through mobile device 102. If the user searched for the location before, mobile device 102 can designate a search query including an address at or near locations 240 through 248, or a business located at or near locations 240 through 248, as a second hint. Mobile device 102 can designate a calendar item in a user calendar (e.g., an appointment or a meeting) located at or near locations 240 through 248 as a third hint.

Upon detecting one or more hints, mobile device 102 can use a shorter time period, e.g., five minutes, as a threshold for determining a location cluster or significant location. More hints can correspond to shorter threshold. Accordingly, mobile device 102 can determine a significant location upon detecting location 242 of the mobile device, when the short time threshold is satisfied.

If no hint is found, mobile device 102 can use a longer time period, e.g., 20 minutes, as a threshold for determining a location cluster or significant location. Accordingly, when no hint is found, mobile device 102 can determine a location cluster or significant location upon detecting location 246 of mobile device 102, when the long time threshold is satisfied. In either case, with or without a hint, mobile device 102 can determine a significant location in real time, e.g., 5 minutes or 20 minutes after locations converge into a cluster.

Figure 3A:
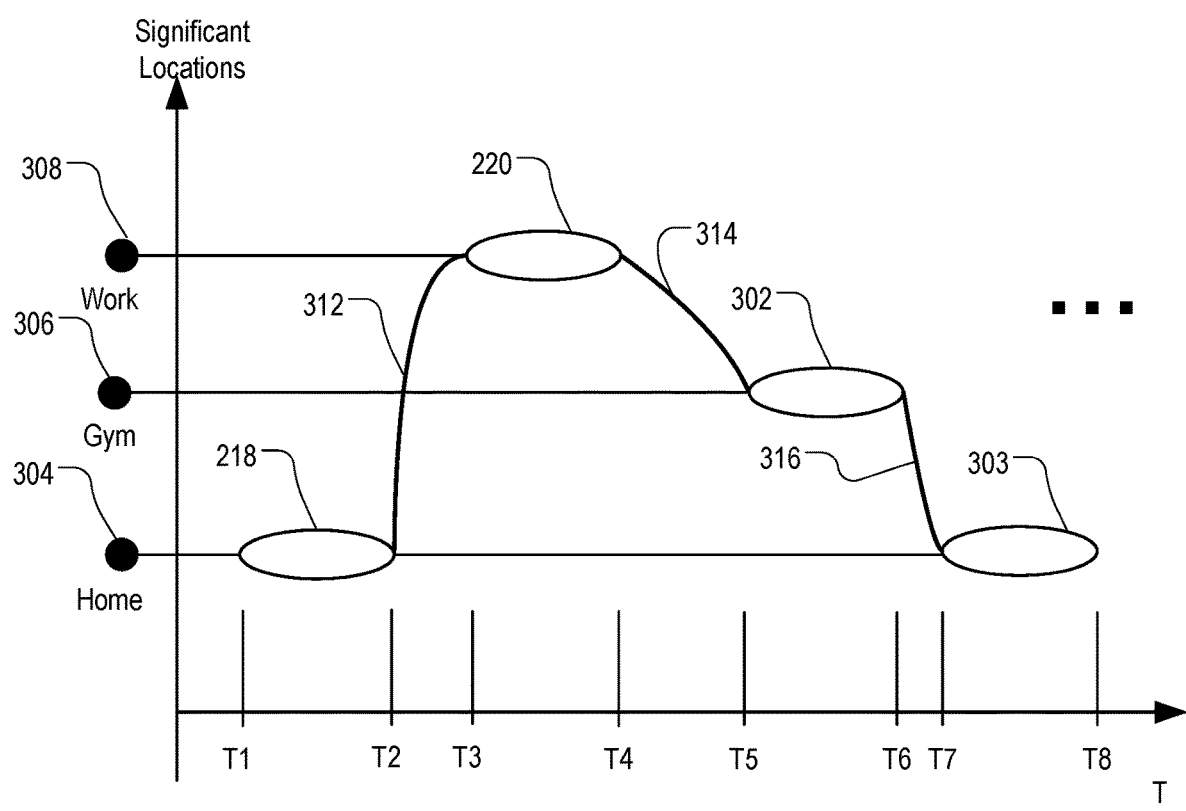
FIG. 3A is a diagram illustrating exemplary techniques of identifying significant locations based on location clusters.

FIG. 3A is a diagram illustrating exemplary techniques of identifying significant locations based on location clusters. Using the techniques described above in reference to FIG. 2, mobile device 102 can identify location clusters 218, 220, 302, and 303. Mobile device 102 can determine significant locations 304, 306, and 308 based on location clusters 218, 220, 302, and 303.

Mobile device 102 can determine each of significant locations 304, 306, and 308 based on location clusters 218, 220, 302, and 303 using the locations in each of location clusters 218, 220, 302, and 303. Determining significant locations 304, 306, and 308 can be based on recursive filter with a constant gain. Details of determining significant locations 304, 306, and 308 are provided below in the next paragraph. Each of significant locations 304, 306, and 308 can include latitude, longitude, and optionally, altitude coordinates. Each of significant locations 304, 306, and 308 can be associated with one or more location clusters. For example, significant location 304 can correspond to location cluster 218 in time period [T1, T2] and location cluster 303 during time period [T7, T8]. Location in location cluster 218 and location cluster 303 can be identical. The length of time period [T1, T2] and time window [T7, T8] can be same or different.

Mobile device 102 can have an initial state model at time T2. At time T2+k, mobile device 102 can receive incremental location data, where k is a difference between time T2 and the time the additional location data are received (in this example, k=T7−T2). Mobile device 102 can use the incremental location data to determine significant location 304 for use in the state model. Mobile device 102 can determine that location cluster 218 corresponds to latitude and longitude coordinates X1. Mobile device 102 can determine that location cluster 303 corresponds to latitude and longitude coordinates X2. Mobile device 102 can determine that a distance between X1 and X2 satisfies a threshold. In response, mobile device 102 can determine that location cluster 218 and location cluster 303 belong to a same location (significant location 304). Mobile device 102 can then add location cluster 303 to significant location 304 using constant gain filter as shown below in filter (1).

$$\frac{X2 + \alpha X1}{1 + \alpha}, \text{ where } \alpha \geq 1 \qquad (1)$$

Each of significant locations 304, 306, and 308 can be associated with one or more entry timestamps and one or more exit timestamps. Each entry timestamp can correspond to a time associated with a first location in a location cluster. For example, a first entry timestamp associated with significant location 304 can be a timestamp associated with location 202, which is the first location of location cluster 218. A second entry timestamp associated with significant location 304 can be a timestamp associated with a first location in location cluster 303. Likewise, each exit timestamp can correspond to a time associated with a last location in a location cluster. For example, a first exit timestamp associated with significant location 304 can be a timestamp associated with location 206, which is the last location of location cluster 218. A second entry timestamp associated with significant location 304 can be a timestamp associated with a last location in location cluster 303.

Each of significant locations 304, 306, and 308 can be associated with a label. The label can be designated by a user (e.g., "Home," "Gym," or "Work"), or automatically determined by mobile device 102 through reverse geocoding. In some implementations, the label can be derived from a semantic analysis of a pattern of the time of day and day of week of each location cluster associated with the significant locations. The semantic analysis can be based on behaviors natural to human beings. Mobile device 102 can be programmed to apply pre-determined patterns that reflect the human behavior. The behavior can include, for example, every human being needs to sleep for some time. The time for sleeping can be a time mobile device 102 is strictly stationary. A user sleeps eight hours a day and eating dinner at home is likely to spend X hours (e.g., 10-12 hours) at home on weekdays, and Y hours on weekends. A user can be at work Monday through Friday for regular hours. Mobile device 102 can leverage these patterns to determine that a significant location as "home" where (1) mobile device 102 spends more than a first threshold number of hours (e.g., 60 hours) per week; (2) mobile device 102 records most entries and exits; and (3) those entries and exists indicate that mobile device 102 stays at least a second threshold number of hours (e.g., eight hours) per day.

For example, mobile device 102 can determine that each location cluster associated with significant location 304 corresponds to a time period designated as evening during weekdays (e.g., from 7:00 pm to 8:00 am next day). Mobile device 102 can then designate significant location 304 as "home" and provide the designation as a label for significant location 304.

Mobile device 102 can determine transitions from one significant location to another. For example, mobile device 102 can determine that, on a given weekday, mobile device 102 transitions (312) from significant location 304 ("Home") to significant location 308 ("Work") between time T2 and time T3. Mobile device 102 can associate the transition with a transition begin timestamp (e.g., T2) and a transition end timestamp (e.g., T3). Mobile device 102 can construct state model 104 based on significant locations 304, 306, and 308 and transitions 312, 314, and 316. Details of state model 104 are described below in reference to FIG. 4.

Figure 3B:
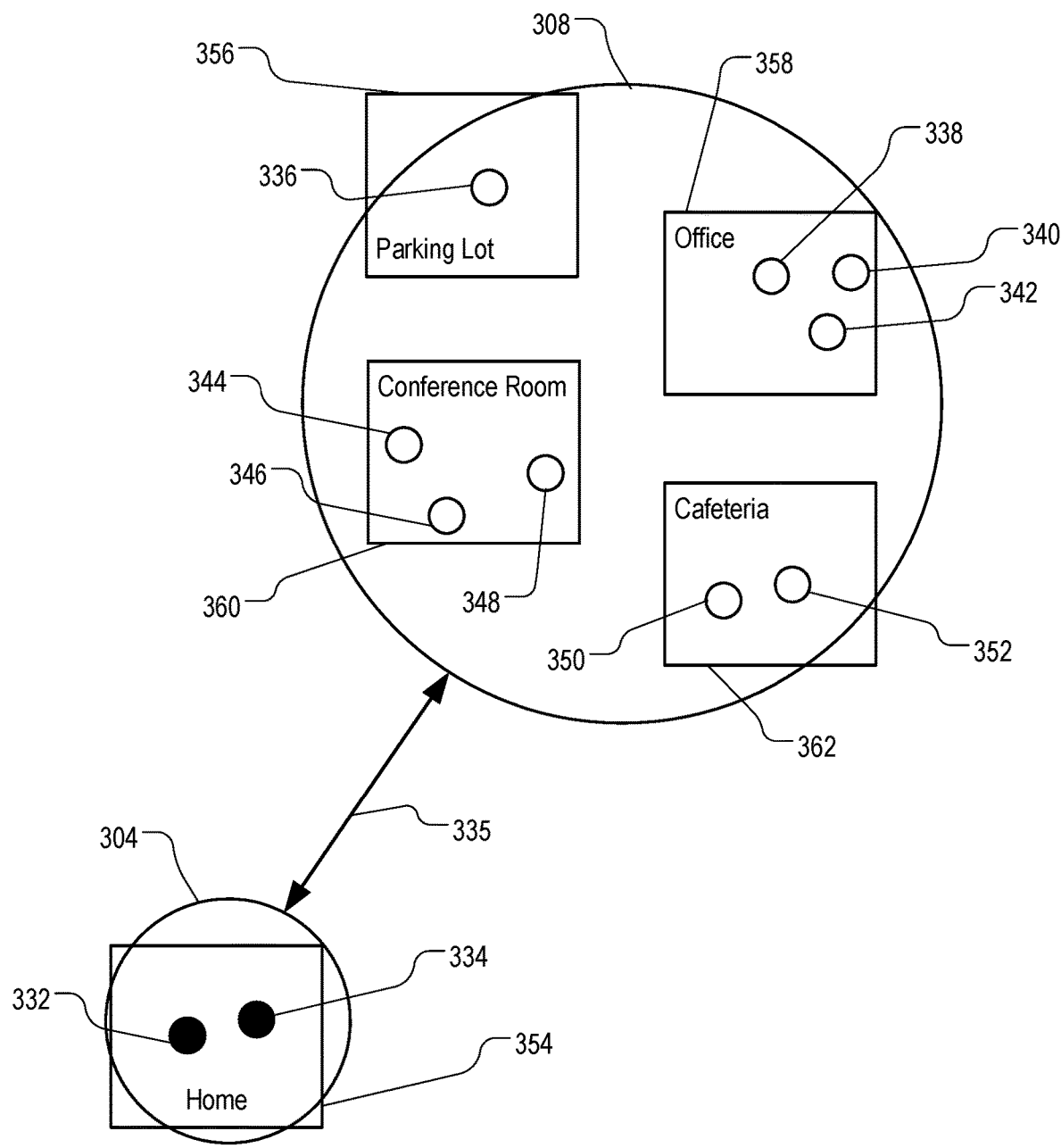
FIG. 3B illustrates exemplary techniques of adaptive clustering.

FIG. 3B illustrates exemplary techniques of adaptive clustering. Mobile device 102 (of FIG. 1) can record a location of mobile device 102 when mobile device 102 uses location based services. Mobile device 102 can record locations and timestamps. Mobile device 102 can determine, based on the recorded locations and timestamps, if the locations converge to a cluster for a period of time. For example, mobile device 102 can determine that mobile device 102 is located at location 332 at a given time, e.g., 8:00 pm, and is located at location 334 at another time, e.g., 11:00 pm. Mobile device 102 can determine that locations of mobile device 102 have not moved away from locations 332 and 334 between 8:00 pm and 11:00 pm. Mobile device 102 can determine that locations 332 and 334, and the locations recorded between 8:00 pm and 11:00 pm, converge into a location cluster having a size determined based on distance between locations 332 and 334. Mobile device 102 can determine that significant location 304 has a first size corresponding to the size of the location cluster.

Mobile device 102 can determine that mobile device transitioned (335) to another location. Mobile device 102 can determine that, during one or more time periods the total of which exceeds a threshold time, mobile device 102 is located at locations 336, 338, 340, 342, 344, 346, 348, 350, and 352. The time periods can include, for example, 8:00 am through 10:00 am on Monday, 8:00 am through 9:00 am on Tuesday, and 10:00 am through 12:00 pm on Wednesday. The locations can be more "spread out" than the locations 332 and 334, due to movement of mobile device 102 between features of a work place including a parking lot, an office, a conference room, and a cafeteria, compared to movement of mobile device 102 between a living room and a bedroom of a home. Mobile device 102 can determine that locations 336 through 352 converge into a location cluster having a size determined based on distance between locations 336 through 352 by measuring deviation among the locations in the location samples. Mobile device 102 can determine that significant location 308 has a second size corresponding to the size of the location cluster. The second size can be bigger than the first size of significant location 304 resulting from the greater spread among locations 336 through 352.

In some implementations, mobile device 102 can match significant location 304 and significant location 308 with map data. For example, mobile device 102 can determine that significant location 304 coincides with building 354 as represented in the map data. In response, mobile device 102 can snap a shape of significant location 304 to the shape of building 354. Likewise, mobile device 102 can determine that significant location 308 matches a set of geographic features that includes parking lot 356, office 358, conference room 360, and cafeteria 362, as represented in the map data. In response, mobile device 102 can determine a shape of significant location according to a bounding box of parking lot 356, office 358, conference room 360, and cafeteria 362.

Figure 4A:
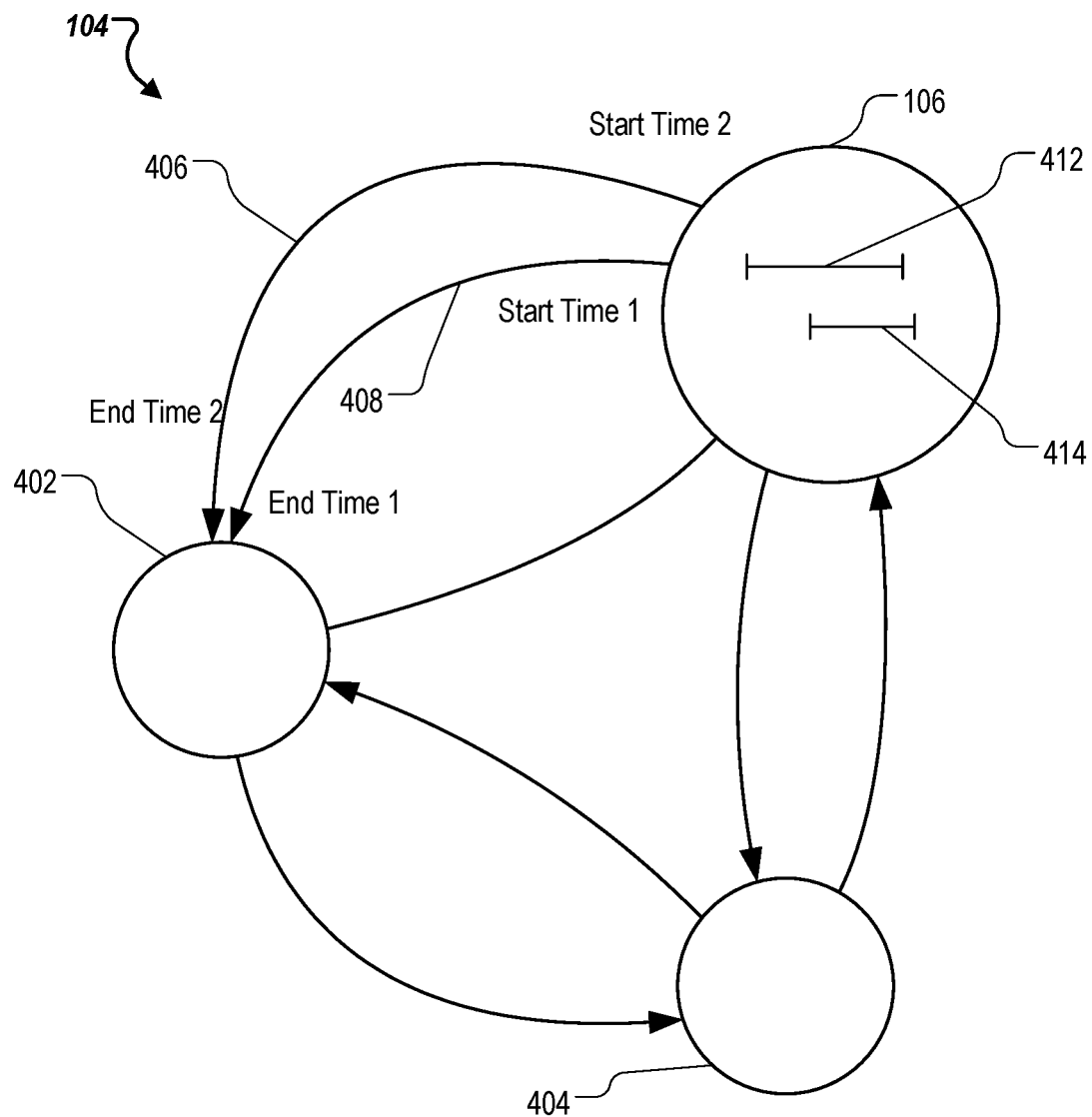
FIG. 4A is a diagram illustrating an exemplary state model determined based on the location clusters.

FIG. 4A is a diagram illustrating exemplary state model 104 determined based on the location clusters. State model 104 can be a first order autoregressive process depicting states and state transitions where a transition into a state q is conditioned by a previous state r. The state and state transitions can be an abstraction of movement of mobile device 102 among significant locations. Compared to a conventional Gauss-Markov model, state model 104 can be a sufficient model, retaining stochastic properties of the state transitions using distribution function in time and duration.

State model 104 can include states 106, 402, and 404. States 106, 402, and 404 can correspond to significant locations 304, 308, and 306, respectively. Mobile device 102 can determine significant locations 304, 308, and 306 based on location clusters 218, 220, 302, and 303, as described above in reference to FIG. 3. Each of states 106, 402, and 404 can be a representation of significant locations 304, 308, and 306, respectively.

State model 104 can include multiple transitions from each state to each other state. The transitions can include, for example, transition 406 from state 106 to state 402, and transition 408 from state 106 to state 402. In state model 104, each transition from state 106 to state 402 can correspond to a transition from a location cluster of significant location 304 to a location cluster of significant location 308. For example, transition 406 can represent transition 312 from location cluster 218 of significant location 304 to location cluster 220 of significant location 308. Transition 408 can represent a transition from location cluster 303 of significant location 304 to a next location cluster of significant location 308.

Each of transitions 406 and 408 can be associated with a transition begin timestamp and a transition end timestamp. Each transition begin timestamp can be a time that mobile device 102 leaves significant location 304 represented by state 106. For example, the transition begin timestamp of transition 406 can be Tuesday, 7:00 am; the transition begin timestamp of transition 408 can be Wednesday, 7:00 am. Each transition end timestamp can be a time that mobile device 102 enters significant location 308 represented by state 402. For example, the transition end timestamp of transition 406 can be Tuesday, 9:00 am; the transition end timestamp of transition 408 can be Wednesday, 9:00 am.

Each state of state model 104 can be associated with one or more state entry timestamps and one or more state exit timestamps. For example, a first state entry timestamp for state 106 can be a time associated with a first location (location 202) of mobile device 102 located in location cluster 218 of significant location 304. A first state exit timestamp can be a time associated with a last location (location 206) of mobile device 102 located in location cluster 218 of significant location 304. The first state entry timestamp and the first state exit timestamp can define first dwell time 412 of mobile device 102 staying at state 106. A second state entry timestamp for state 106 can be a time associated with a first location of mobile device 102 located in location cluster 303 of significant location 304. A second state exit timestamp can be a time associated with a last location of mobile device 102 in location cluster 303 of significant location 304. The second state entry timestamp and the second state exit timestamp can define second dwell time 414 of mobile device 102 staying at state 106.

Figure 4B:
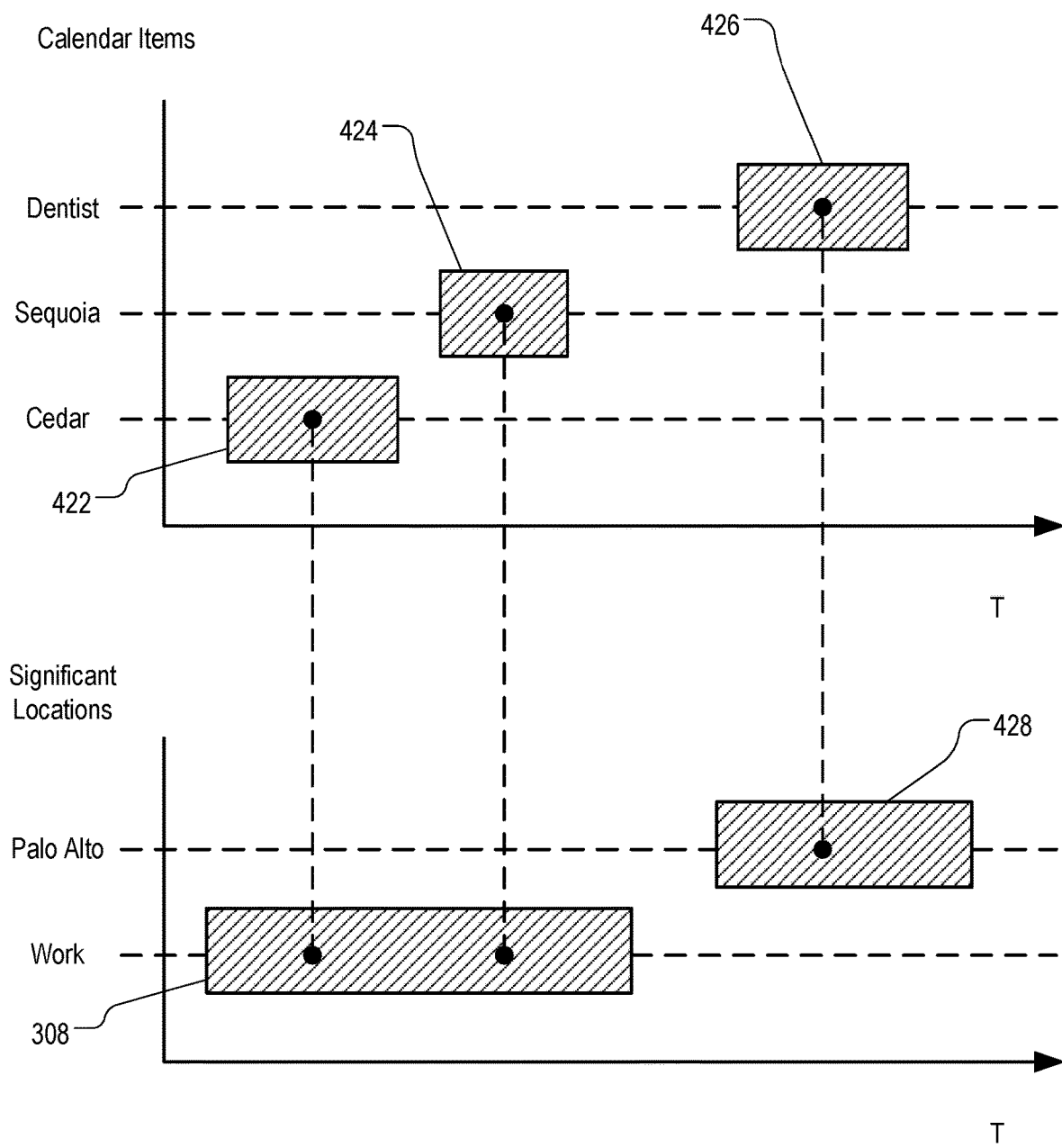
FIG. 4B illustrates exemplary techniques for determining locations of calendar items.

FIG. 4B illustrates exemplary techniques for determining locations of calendar items. Mobile device 102 (of FIG. 1) can execute a calendar application program in which a user can specify calendar items for mobile device 102 to provide alerts or reminders. Mobile device 102 can determine, from a user input or from an application program (e.g., an email program), calendar items 422, 424, and 426. Each of calendar items 422, 424, and 426 can be associated with a respective text string, e.g., "Cedar," "Sequoia," and "Dentist." Each text string can be a subject line of a respective calendar item or a body of the respective calendar item. Each of calendar items 422, 424, and 426 can be associated with a respective time, e.g., 9:00 am through 10:30 am Wednesday, 11:00 am through 12:00 noon Wednesday, and 2:00 pm through 3:30 pm Wednesday. Mobile device 102 can make the association over multiple instances to increase a certainty that the association is correct. For example, a calendar application program may have multiple calendar items including a string "Sequoia" indicating a conference room. Mobile device 102 may or may not always be in the "Sequoia" conference room at time as indicated in the calendar items. By making the association over multiple instances, mobile device 102 can determine a most visited location to be the location of the "Sequoia" conference room.

Mobile device 102 can determine that, during the time period associated with calendar items 422 and 424, mobile device 102 is located at significant location 308 designated as "work" and that, during the time period associated with calendar item 426, mobile device 102 is located at significant location 428 designated as "Palo Alto." Accordingly, mobile device 102 can store each of the text strings "Cedar," "Sequoia," and "Dentist" in association with a respective location. For example, mobile device 102 can store, in a text database, each of the text strings "Cedar" and "Sequoia" in association with geographic coordinates of significant location 308, and store text string "Dentist" in associate with geographic coordinates of significant location 428. Mobile device 102 can provide the stored information to a location service for providing various user assistances.

For example, mobile device 102 can receive a calendar item specifying a time in the future, e.g., 5:00 pm on a given day six months later. The calendar item can include a text string "visit dentist." Mobile device 102 can determine that the text string matches one that is stored in the text database. Accordingly, mobile device 102 can determine that a user is likely to visit significant location 428 at 5:00 pm on that given day. On that day, mobile device 102 can determine an estimated travel time from a location of mobile device 102 to significant location 428, e.g., 25 minutes. Accordingly, mobile device 102 can automatically provide an alert for display at least 25 minutes before 5:00 pm on that day and indicating to the user that the user should start heading for significant location 428 to be on time for the calendar item.

Figure 5:
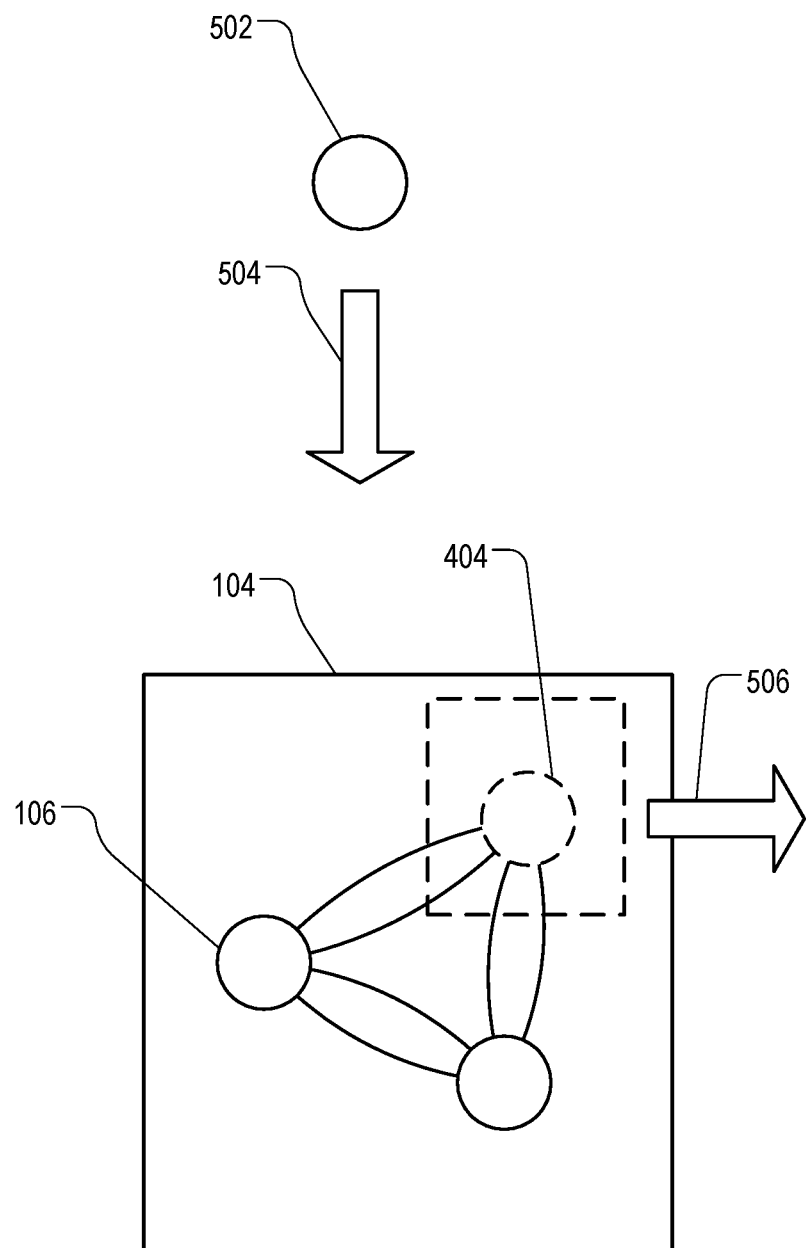
FIG. 5 is a diagram illustrating incremental changes to the state model.

FIG. 5 is a diagram illustrating incremental changes to state model 104. State model 104 can have a variable topology, allowing incremental addition of new states and deletion of obsolete states.

Mobile device 102 can determine new state 502. For example, mobile device 102 can determine that a series of location readings indicate that mobile device 102 is located at a place for a sufficiently long duration that, with sufficient certainty, that the place is a significant location. Mobile device 102 can determine that the significant location is not represented in state model 104. In response, mobile device 102 can create new state 502, and add (504) new state 502 to state model 104. Mobile device 102 can add transitions to state 502 based on a last significant location visited by mobile device 102 prior to visiting state 502. Mobile device 102 can associate state 502 with a state entry timestamp of a first location reading indicating mobile device 102 is located at the significant location of state 502. Mobile device 102 can associate state 502 with a state exit timestamp of a last location reading indicating mobile device 102 is at the significant location represented by state 502 before mobile device 102 enters another significant location. Mobile device 102 can add transitions from state 502 based on the next significant location visited by mobile device 102 and represented in state model 104.

In addition to adding states, mobile device 102 can periodically remove states from state model 104. Mobile device 102 can determine that, for a sufficiently long time (e.g., exceeding an X day or week threshold), mobile device 102 has not visited a significant location represented by state 404. Accordingly, mobile device 102 can remove (506) state 404 from state model 104. Removing state 404 can include removing transitions into state 404 and transitions from state 404.

Mobile device 102 can use state model 104 to predict a future location of mobile device 102. Predicting the future location can be based at least in part on a current location of mobile device 102. The current location can be "in state," where the current location is represented by a state of state model 104. Upon determining that the current location is in state, mobile device 102 can predict the future location based on transition probability densities between states. The current location can be "out of state," where the current location is not represented by a state of state model 104. Upon determining that the current location is out of state, mobile device 102 can predict the future location based on entry probability densities of entering a state of state model 104 from the current location. Details on determining the transition probability densities and entry probability densities are described below in reference to FIGS. 6A and 6B.

Figure 6A:
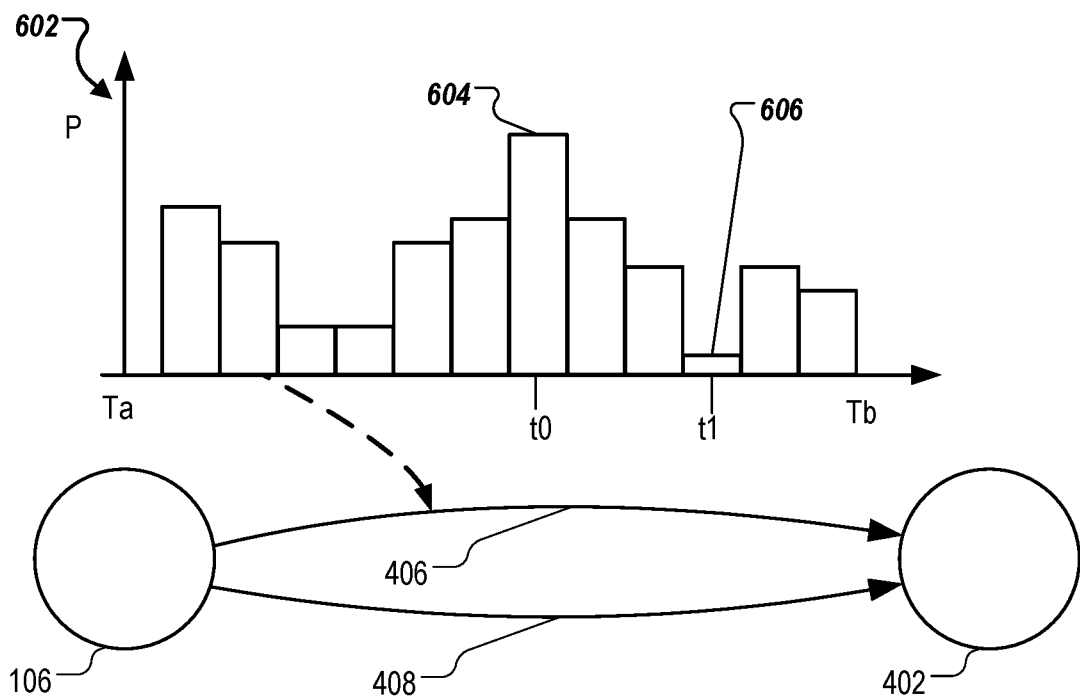
FIG. 6A is a diagram illustrating determining a transition probability density between exemplary states.

FIG. 6A is a diagram illustrating determining a transition probability density 602 between exemplary states 106 and 402. Transition probability density 602 can indicate a probability distribution of mobile device 102 transitions from state 106 to state 402 of state model 104. Mobile device 102 can determine transition probability density 602 upon receiving a request to predict a future location of mobile device 102. The request can be associated with a current time and a future time. At the current time, mobile device 102 can be located at a significant location corresponding to state 106. The future time can be a point in time or a time window.

Transition probability density 602 can be a distribution over a time period, e.g., [Ta, Tb], where Ta is a starting time, and Tb is an ending time of the time period. The time period [Ta, Tb] can be a window of forecast. In some implementations, the starting time Ta can correspond to the current time, or the current time with a bias (e.g., X minutes before or after the current time); the ending time Tb can correspond to the future time, or the future time with a bias (e.g., Y minutes before or after the future time). In some implementations, the starting time Ta and ending time Tb can correspond to a beginning and an ending of a time window (e.g., a day or a week), respectively.

Mobile device 102 can determine transition probability density 602 based on past transitions of mobile device 102 from state 106 to state 402. At a given time between Ta and Tb, (1) more transitions from state 106 to state 402 in the past at the given time can correspond to a higher probability density value; (2) more certainty on the transitions in the past at the given time can correspond to a higher probability density value; and (3) a more stable pattern of transitions in the past at the given time can correspond to a higher probability density value.

For example, t0 corresponds to 8:00 am, and t1 corresponds to 3:00 pm. In the past, and as recorded in state model 104, X number of transitions occurred between state 106 and state 402 between 7:00 am and 9:00 am; and Y number of transitions occurred between 2:00 pm and 4:00 pm. If X is greater than Y, t0 can correspond to comparatively higher probability density value 604, whereas t1 can correspond to comparatively lower probability density value 606.

In addition, the certainty of the transitions can be relevant. If a mean time of the transition start timestamps of the X transitions is closer to t0 than a mean time of the transition start timestamps of the Y transition is closer to t1, t0 can correspond to comparatively higher probability density value 604, whereas t1 can correspond to comparatively lower probability density value 606. If a variance of the transition start timestamps of the X transitions is smaller than a variance of the transition start timestamps of the Y transitions, t0 can correspond to comparatively higher probability density value 604, whereas t1 can correspond to comparatively lower probability density value 606.

In addition, stability of patterns of transitions in the past can be relevant. Mobile device 102 can determine a pattern of movement based on time. For example, mobile device 102 can determine, based on transitions in state model 104, that movement of mobile device 102 follows a weekly pattern. On weekdays, mobile device 102 transitions from state 106 to state 402 between 7:00 am and 9:00 am. On weekends, mobile device 102 transitions from state 106 to state 402 between 2:00 pm and 4:00 pm. Based on this identified weekly pattern, mobile device 102 can associate a comparatively higher probability density value 604 for time t0 if t0 is in a weekday, or associate a comparatively lower probability density value for time t0 if t0 is in a weekend day.

Transition probability density 602 can be discrete or continuous. Upon determining transition probability density 602 and other transition probability densities between states of state model 104, mobile device 102 can determine a time-based likelihood of mobile device 102 transitioning from a current state (e.g., state 106) to each other state directly or indirectly (e.g., through one or more intermediate states). Mobile device 102 can determine a predicted future location of mobile device 102 based on the current location, the future time, and the probabilities of mobile device 102 transitioning to each state.

Figure 6B:
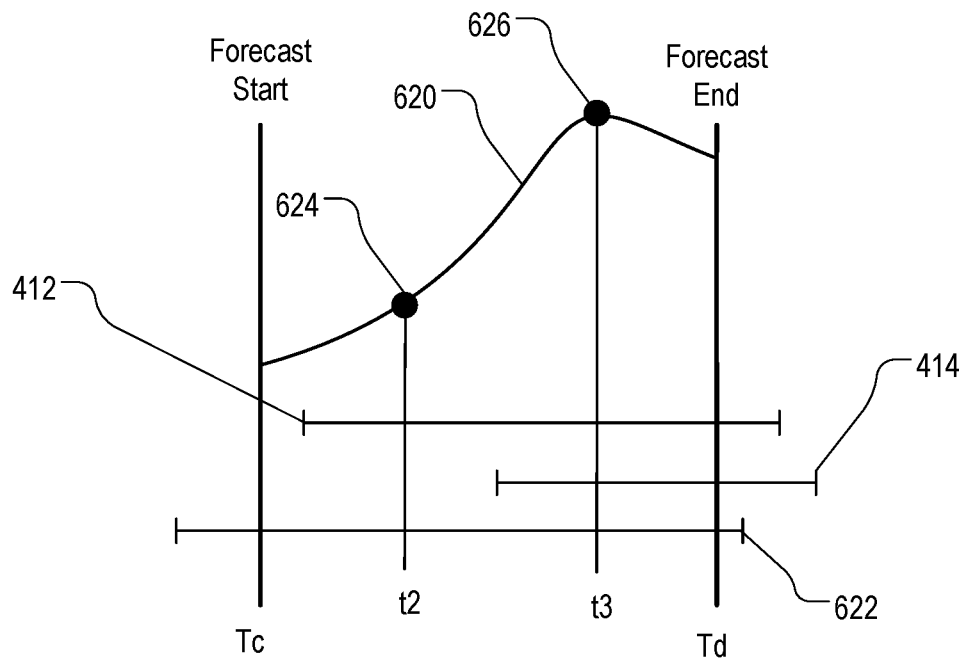
FIG. 6B is a diagram illustrating determining an entry probability density of an exemplary state.

FIG. 6B is diagram illustrating determining entry probability density 620 of exemplary state 106. Entry probability density 620 can indicate a probability distribution that mobile device 102 enters state 106 from a current location that is not represented in state model 104. Mobile device 102 can determine entry probability density 620 upon receiving a request to predict a future location of mobile device 102. The request can be associated with a current time and a future time. At the current time, mobile device 102 can be located at the un-represented current location. The future time can be a point in time or a time window.

Entry probability density 620 can be a distribution over a time period, e.g., [Tc, Td], where Tc is a starting time, and Td is an ending time of the time period. The time period [Tc, Td] can be a window of forecast. In some implementations, the starting time Tc can correspond to the current time, or the current time with a bias (e.g., X minutes before or after the current time); the ending time Td can correspond to the future time, or the future time with a bias (e.g., Y minutes before or after the future time). In some implementations, the starting time Tc and ending time Td can correspond to a beginning and ending of a time window (e.g., a day or a week), respectively.

Mobile device 102 can determine entry probability density 620 based on dwell time of mobile device 102 in state 106. The dwell time, e.g., dwell time 412, 414, and 622, can be determined as described above in reference to FIG. 4.

At a given time between Tc and Td, (1) more number of stays of mobile device 102 in state 106 in the past at the given time can correspond to a higher probability density value; (2) more certainty on the entry into the state 106 in the past can correspond to a higher probability density value; and (3) a more stable pattern of entry into state 106 in the past can correspond to a higher probability density value.

For example, t2 corresponds to 10:00 am, and t2 corresponds to 3:00 pm. In the past, and as recorded in state model 104 by dwell time 412, 414, and 622, on X number occasions, mobile device 102 is located in state 106 at time t2; and on Y number occasions, mobile device 102 is in state 106 at time t3. If X is less than Y (e.g., in this example, X=2, Y=3), t2 can correspond to comparatively lower probability density value 624, whereas t3 can correspond to comparatively lower probability density value 626.

Additionally or alternatively, mobile device 102 can determine, based on state dwelling time determined from state model 104, that location of mobile device 102 follows a weekly pattern. For example, mobile device 102 can determine that dwell time 414, and a number of other dwell times occur only on weekdays, whereas dwell times 412 and 622 occur only on weekends. Based on this identified weekly pattern, mobile device 102 can associate lower probability density value 624 to time t2 and higher probability density value 624 to time t3 if time t2 and time t3 fall on a weekday. Mobile device 102 can associate equal probability density values to time t2 and time t3 fall on a weekend day.

Entry probability density 620 can be discrete or continuous. Upon determining entry probability density 620 and other entry probability densities between states of state model 104, mobile device can determine a time-based likelihood of mobile device 102 enters from a current location to each other state directly or indirectly (e.g., through one or more intermediate states). Mobile device 102 can determine a predicted future location of mobile device 102 based on the current location, the future time, and the probabilities of mobile device 102 entering each state.

Mobile device 102 can filter out states from state model 104 before, during, or after calculating the entry probability densities based on various factors. Filtering out a state can include preventing the state being used for a particular location prediction without removing the state from state model 104. The factors for filtering out a state can include a distance between the current location and the location represented by the state in state model 104. Mobile device 102 can filter out a state upon determining that, during the forecast time window, mobile device 102 is unlikely to reach from the current location to the location of that state. Mobile device can perform the filtering based on a time difference between the current time and the starting time or the ending time of the time window, and a pre-specified maximum speed of movement of mobile device 102.

For example, mobile device 102 can determine that the time difference between the current time and the closing time Td of the forecasting time window is X hours. Mobile device can determine that a distance between the current location and the significant location represented by state 106 is Y kilometers. Based on a pre-specified maximum speed of Z kilometers per hour, mobile device 102 can filter out state 106 upon determining that X*Z<Y, indicating that mobile device 102 cannot reach the location represented by state 106 in X hours, even if travelling at maximum speed.

Figure 6C:
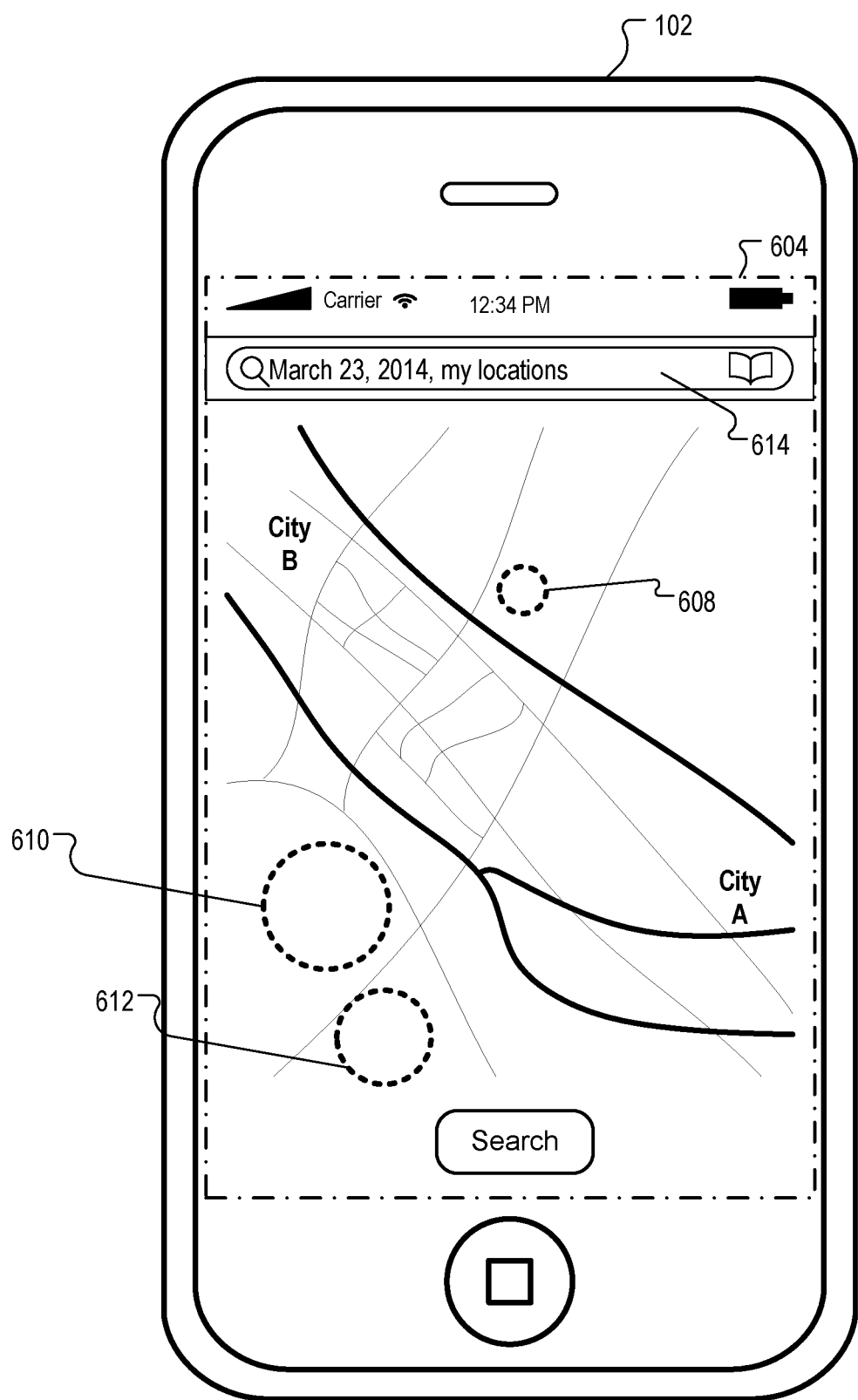
FIG. 6C illustrates an exemplary user interface for displaying significant locations.

FIG. 6C illustrates an exemplary user interface 605 for displaying significant locations. User interface 605 can be displayed on mobile device 102. User interface 605 can include a map display for displaying significant locations, e.g., significant locations indicated by markers 608, 610, and 612. User interface 605 can include search box 614, where a user can enter a search query for significant locations. In the example shown, the user entered the date/time span query "Mar. 23, 2014, my locations." This example query is requesting a search for significant locations that the user visited on Mar. 23, 2014. Upon receiving an input initiating a search (e.g., selecting a "Search" button), the mobile device searches a significant location data store, determines significant locations visited on Mar. 23, 2014, generates markers 608, 610, and 612 that represent the significant locations, and displays markers 608, 610, and 612 on a map. Markers 608, 610, and 612 can have different sizes, corresponding to different sizes of the represented significant locations.

Exemplary Device Components

Figure 7A:
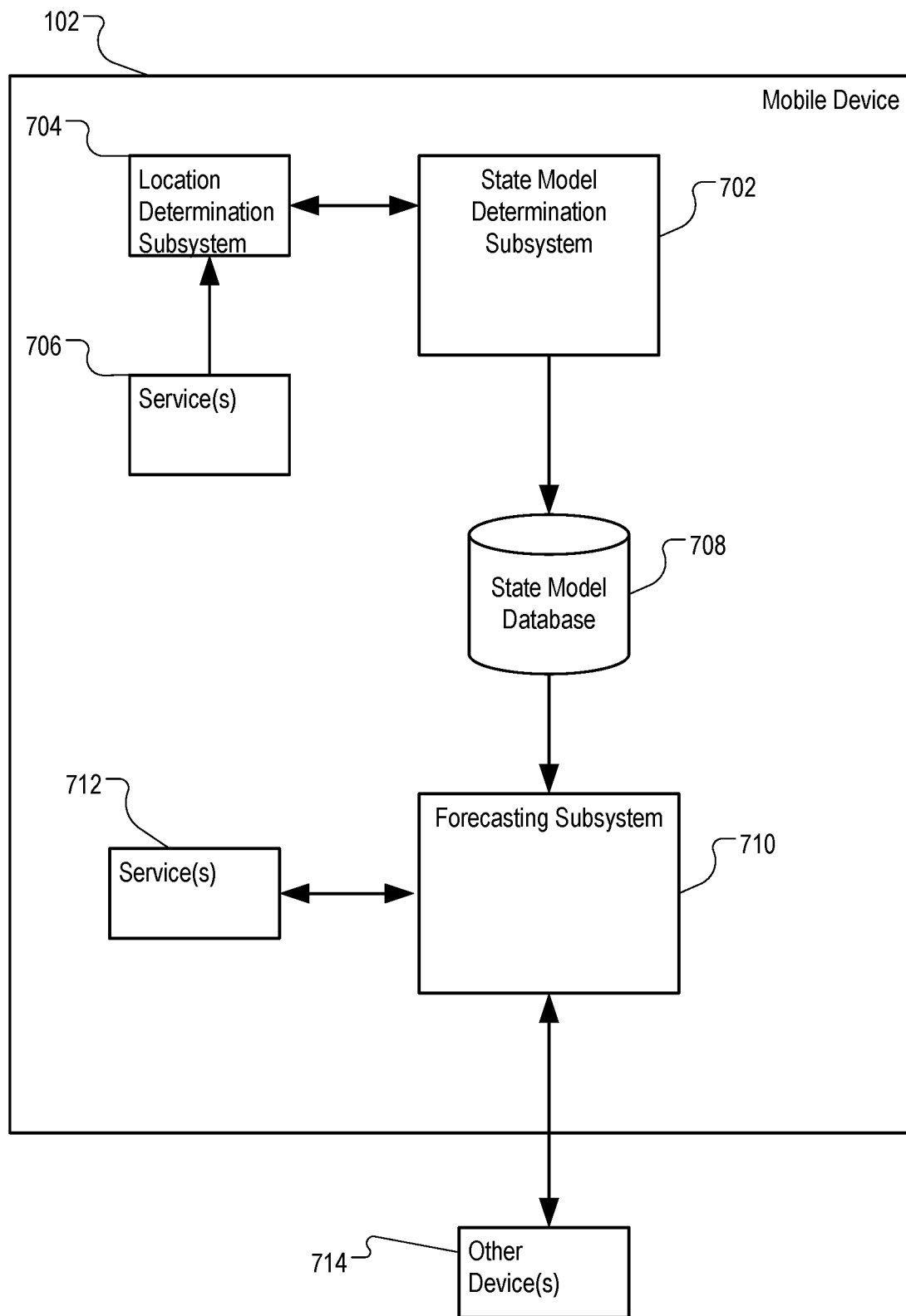
FIGS. 7A, 7B, and 7C are block diagrams illustrating components of an exemplary mobile device implementing predictive user assistance.

FIG. 7A is a block diagram illustrating components of exemplary mobile device 102 implementing predictive user assistance. Each component of mobile device 102 can include hardware and software components.

Mobile device 102 can include state model determination subsystem 702. State model determination subsystem 702 can be a component of mobile device 102 programmed to determine a state model (e.g., state model 104) using location data from location determination subsystem 704. The location data can include a series of one or more location readings, each being associated with a timestamp. The location readings can include latitude, longitude, and optionally, altitude coordinates.

Location determination subsystem 704 is a component of mobile device 102 programmed to determine a location of mobile device 102 using a satellite navigation system (e.g., GPS), a cellular communications system (e.g., by triangulation using cellular towers), or wireless access gateways (e.g., by triangulation using known access point locations).

Mobile device 102 can include one or more services 706. Services 706 can include functions of an operating system of mobile device 102 or one or more application programs. Services 706 can request location data from location determination subsystem 704. The request can activate location determination subsystem 704.

State model determination subsystem 702 can be configured to read location data provided by location determination subsystem 704 upon activation of location determination subsystem 704 by services 706. Triggering reading location data by activation of location determination subsystem 704 can avoid or minimize consumption of battery power by operations of determining the state model. Based on the location data, state model determination subsystem 702 can determine a state model and store the state model in state model database 708. State model database 708 can include a storage device on mobile device 102 or on a server located remotely from mobile device 102.

Mobile device 102 can include forecasting subsystem 710. Forecasting subsystem 710 is a component of mobile device 102 configured to determine a predicted future location of mobile device 102 based on the state model stored in state model database 708. One or more services 712 or other devices 714 can request a forecast from forecasting subsystem 710. The request can be associated with a future time point or time window. In response, forecasting subsystem 710 can provide one or more predicted future locations corresponding to the future time or time window.

Figure 7B:
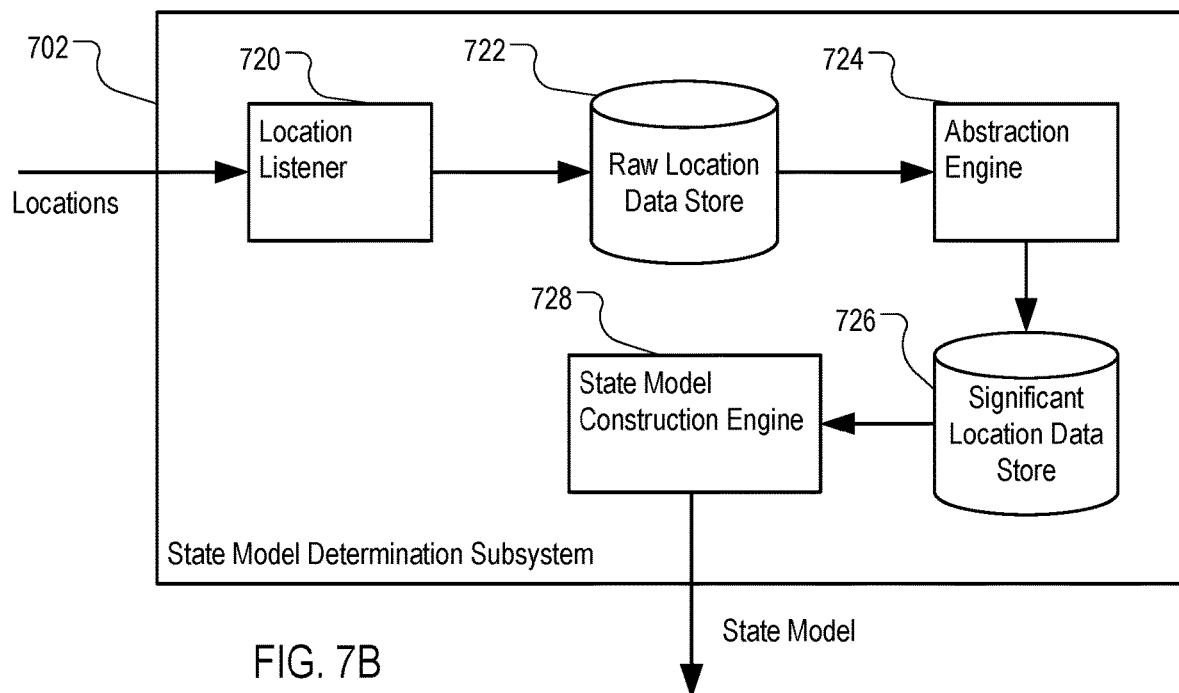

FIG. 7B is a block diagram illustrating components of exemplary state model determination subsystem 702 of FIG. 7A. Each component of state model determination subsystem 702 can include hardware and software components.

State model determination subsystem 702 can include location listener 720. Location listener 720 is a component of state model determination subsystem 702 configured to read location data from location determination subsystem 704 upon being triggered by an activation of location determination subsystem 704. In some implementations, location listener 720 can be programmed to activate location determination subsystem 704 periodically to obtain the location data.

Location listener 720 can store the location data received from location determination subsystem 704 to raw location data store 722. Raw location data store 722 can be a storage device of mobile device 102 programmed to store raw location data as read from location determination subsystem 704. Raw location data store 722 can enforce a persistency policy where the raw location data are purged after a specified persistency period based on user request or privacy policy.

State model determination subsystem 702 can include abstraction engine 724. Abstraction engine 724 is a component of state model determination subsystem 702 configured to access the location data stored in raw location data store 722. Based on the location data, abstraction engine 724 can determine location clusters based on one or more pre-specified conditions. The conditions can include a minimum number of locations for establishing a significant location (e.g., two), a threshold time window (e.g., minimum of X minutes), and outlier criteria. Abstraction engine 724 can determine the significant locations visited by generating abstractions of the location clusters. Abstraction engine 724 can store the significant locations in location data store 726.

Location data store 726 is a storage device of state model determination subsystem 702 configured to store significant locations determined by abstraction engine 724. Location data store 726 can enforce a persistency policy where the significant locations are purged after a specified persistency period. The persistence policy for location data store 726 can be different from the persistence policy for raw location data store 722.

State model determination subsystem 702 can include state model construction engine 728. State model construction engine 728 is a component of state model determination subsystem 702 configured to read the significant locations from location data store 726, and generate state model 104. In addition, state model construction engine 728 can be configured to maintain state model 104 by adding and removing states to state model 104.

Figure 7C:
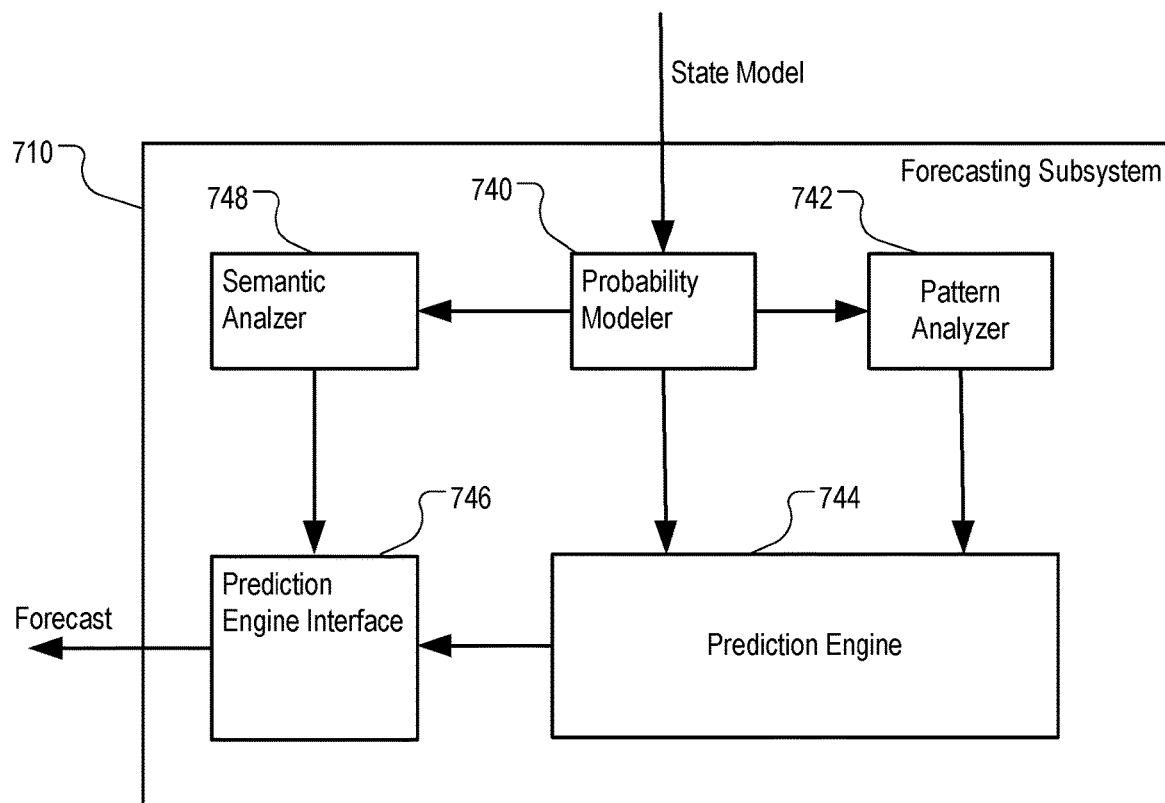

FIG. 7C is a block diagram illustrating components of exemplary forecasting subsystem 710 of FIG. 7A. Each component of forecasting subsystem 710 can include hardware and software components.

Forecasting subsystem 710 can include probability modeler 740. Probability modeler 740 is a component of forecasting subsystem 710 configured to determine probability densities (e.g., transition probability density 602 and entry probability density 620) based on states and transitions of a state model (e.g., state model 104). Probability modeler 740 can determine the probability densities for transitions and entries over a time window.

Forecasting subsystem 710 can include pattern analyzer 742. Pattern analyzer 742 is a component of forecasting subsystem 710 configured to determine a pattern of movement of mobile device 102 over a time period. The time period can be a day, a week, a month, or a year. Pattern analyzer 742 can determine whether to determine a pattern based on a day, a week, a month, or a year based on longevity of state model 104. For example, pattern analyzer 742 can determine whether state model 104 has satisfied a longevity threshold (e.g., contains at least X weeks of data).

Upon determining that state model 104 satisfies the threshold, pattern analyzer 742 can determine a weekly pattern. The weekly pattern can include a probability distribution calculated for each day of week, where, for example, a probability distribution for Monday is determined separately from a probability distribution for Sunday. Upon determining that state model 104 does not satisfy the threshold, pattern analyzer 742 can determine a daily pattern. The daily pattern can include a probability distribution calculated for each hour of day, where, for example, a probability distribution for 9:00 am to 10:00 am is determined separately from a probability distribution for 5:00 pm to 6:00 pm.

In some implementations, pattern analyzer 742 can determine a daily pattern upon determining that mobile device 102 has moved to a new place. For example, pattern analyzer 742 can determine that, the distances between each of the last X number of new states and each state older than the last X number of new states exceed a local threshold (e.g., Y kilometers), indicating that mobile device 102 has recently travelled to a new location (e.g., to a vacation place). Upon the determination, pattern analyzer 742 can determine the daily pattern, starting from the last X number of states.

Forecasting subsystem 710 can include prediction engine 744. Prediction engine 744 is a component of forecasting subsystem 710 configured to receive a current time and a current location and determine a forecast location. Prediction engine 744 can determine a predicted location of mobile device 102 based on the probability densities for transitions and entries provided by probability modeler 740 and the movement patterns provided from pattern analyzer 742. Prediction engine 744 can identify multiple candidate future locations based on the probability densities and the movement patterns. Prediction engine 744 can then rank the candidate future locations using various attributes.

The attributes used by prediction engine 744 to rank the candidate future locations can include a last visit to a candidate future location as represented by a state, where a more recent visit can be associated with a higher ranking. The attributes can include data longevity of the state associated with the candidate location, where a state having a longer data history can be associated with a higher ranking. The attribute can include a likelihood associated with a forecast time window, which is determined based on a current location, a future time of the forecast time window, and a length of the forecast time window. The attributes can include an aggregated dwell time, where a state having longer aggregated dwell time can be ranked higher. The attributes can include a number of visits to the state of the candidate location, where more visits or a higher frequency of visits to the state can be ranked higher. Prediction engine 744 can provide one or more candidate future locations, including the highest ranked candidate future location, to prediction engine interface 746 as a forecast.

Prediction engine interface 746 can be a component of mobile device 102 configured to implement an application programming interface (API) to prediction engine 744 such that an application program, function, or device complying with the API can access the forecast determined by prediction engine 744. In some implementations, prediction engine interface 746 can include an interface to other devices 714, e.g., external display screens or GPS devices, and provide the forecast location to other devices 714.

Forecasting subsystem 710 can include semantic analyzer 748. Semantic analyzer 748 is a component of forecasting subsystem 710 configured to determine a meaning of each significant location based on pattern of visit to the significant location. Semantic analyzer 748 can generate labels (e.g., "work" or "home") based on the meaning and provide the labels to prediction engine interface 746 to be associated with the forecast.

Figure 7D:
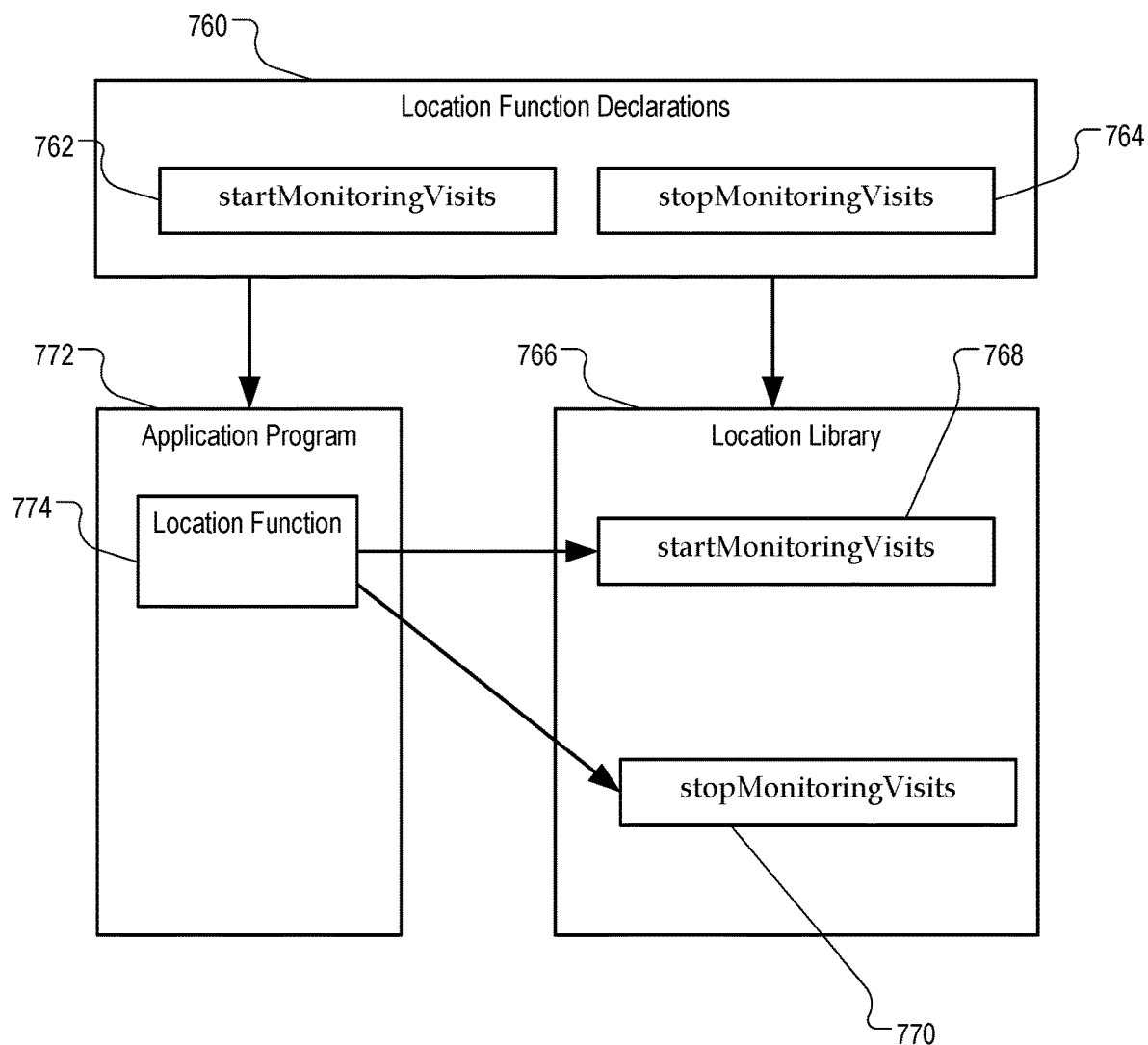
FIG. 7D is a block diagram illustrating exemplary location API.

FIG. 7D is a block diagram illustrating exemplary location API. The API can be implemented on mobile device 102. The API can include location function declarations 760. Location function declarations 760 can be implemented using a header file, e.g., a .h file in an object oriented C programming language, e.g., Objective-C or C++.

Location function declarations 760 can include start monitoring visit function declaration 762 and stop monitoring visit declaration 764. Each of the declarations 762 and 764 can declare a name of a respective function, the name being indicative of the operations of the function. Each of the declarations 762 and 764 can declare a return type of a respective function. Each of the declarations 762 and 764 can declare whether a respective function is a class method or an instance method. For example, a class method can be represented by a plus (+) sign before the function name. An instance method can be represented by a minus (−) sign before the function name. Each of the declarations 762 and 764 can declare parameters of the respective function.

The functions can be defined in location function library 766. Location function library 766 can include definition 768 for the start monitoring visit function and definition 770 for the stop monitoring visit function. Each of definition 768 and definition 770 can include programming instructions for start and stop monitoring a location visit. A location visit can be an event that includes at least one of an arrival at or a departure from a location.

Application program 772 can call the start monitoring visit function and the stop monitoring visit function through the API. For example, application program can be programmed to include location function declarations 760 by including the header file for compilation. Application program 772 can include location function 774. Location function 774 can include, for example, computer instructions operable to cause a processor of mobile device 102 to determine location clusters and significant locations. Location function 774 can call the start monitoring visit function and the stop monitoring visit function as declared in location function declarations 760 and as defined in location library 766.

Exemplary Procedures

Figure 8A:
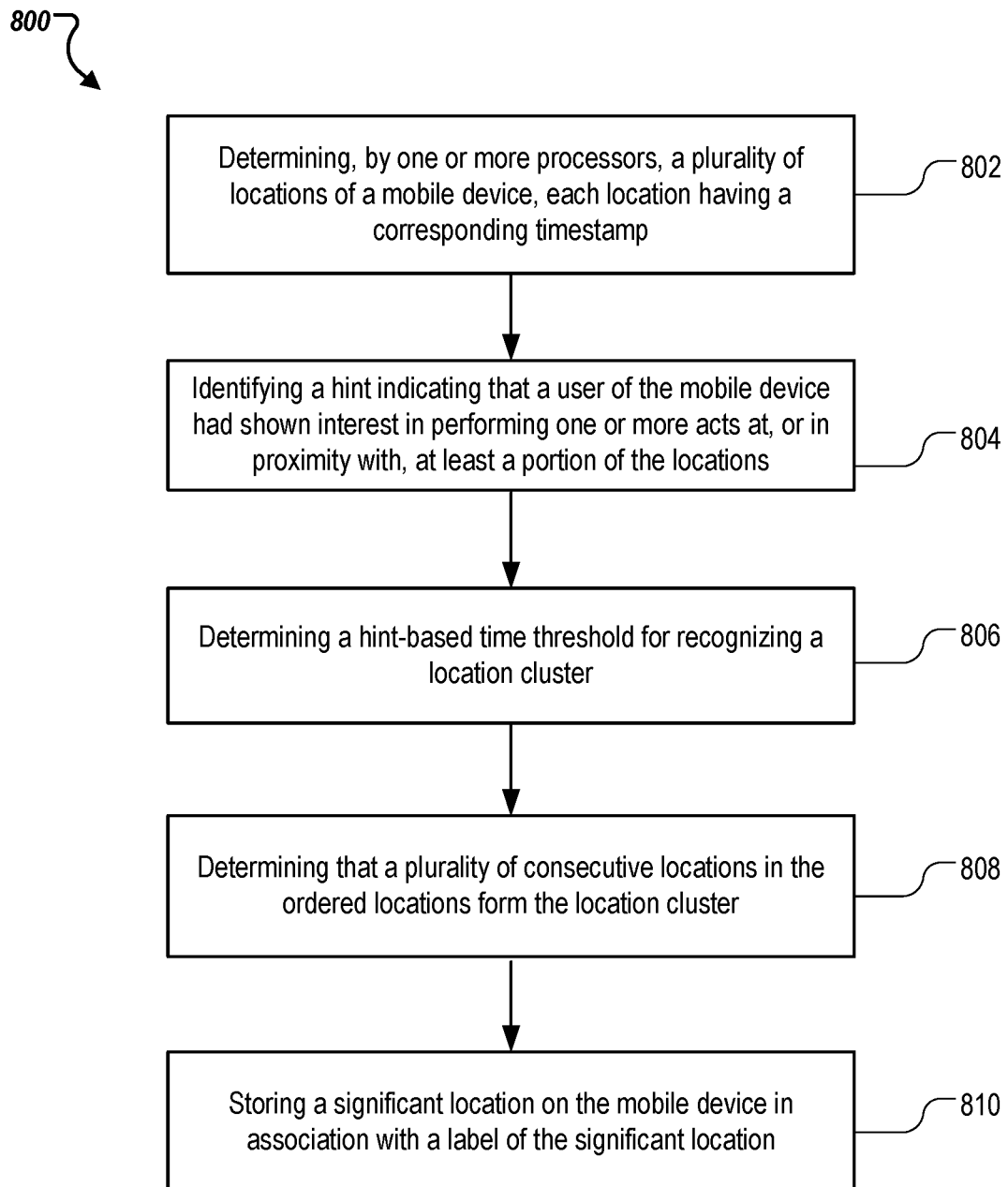
FIG. 8A is a flowchart illustrating an exemplary procedure of hint based location determination.

FIG. 8A is a flowchart illustrating an exemplary procedure 800 of hint based location determination. Procedure 800 can be performed by a system including one or more processors. The system can include mobile device 102.

The system can determine (802) multiple locations of the mobile device. Each location can be associated with a timestamp indicating a time the location was determined by a location determination subsystem. The locations can be ordered sequentially based on timestamps of the locations. Determining the locations can include reading the location (e.g., latitude and longitude) from the location determination subsystem one at a time. Each reading of the location determination subsystem can be triggered by an activation of the location determination subsystem by an application program requesting a location-based service. The system can filter the locations from the location determination subsystem by removing outliers using a statistical filter.

The system can identify (804) a hint indicating that a user of the mobile device had shown interest in performing one or more acts at, or in proximity with, at least a portion of the locations. The hint can include at least one of a present act performed on the mobile device or detected by the mobile device, or a historical record of an act performed on the mobile device or detected by the mobile device.

For example, the hint can include a present act. The present act can include a change in motion mode detected by the mobile device indicating that the user has entered or exited a vehicle. The present act can include a power plugin event indicating that the mobile device is plugged into a power charger. The present act can include a network handshake indicating that the mobile device is being connected to a wired or wireless communications network. Additionally or alternatively, the hint can include a historical record. The historical record can include a record of a search, the search including a search input on the mobile device and a search result including an address of the geographic location. The historical record can include a calendar item indicating an appointment is to occur at the geographic location. The historical record can include a record indicating that the mobile device established a wireless connection to a wireless device located at the geographic location. The historical record can include a record indicating that the mobile device was plugged into a charger device or a computing device at the geographic location. The historical record can include a record of a previous visit by the mobile device at the geographic location.

The system can determine (806) a hint-based time threshold for recognizing a location cluster, including reducing, upon the identified hint, a pre-specified time threshold for establishing the location cluster.

The system can determine (808) that a set of consecutive locations in the ordered locations form a location cluster upon determining that a time difference among the set of consecutive locations is longer than the hint-based time threshold. The location cluster can indicate that the mobile device has dwelled at a geographic location sufficiently long to indicate a sufficient location for the user. Determining that the consecutive locations form the location cluster can occur in real time while the mobile device moves into or out of the geographic location, or in batch mode, e.g., once every day at 2:00 am.

The system can store (810) the significant location on the mobile device in association with a label of the significant location. The system can designate the significant location as a state in the state model for estimating a place that the user is likely to move to at a future time and for providing predictive user assistance according to the estimated place. The state model can represent each movement of the mobile device from a first significant location to a second significant location as a transition from a first state representing the first significant location to a second state representing the second significant location. The transition being associated with a transition start time and a transition end time.

The system can provide the state model to a forecasting subsystem of the mobile device for generating a forecast that a future location of the mobile device at a given future time is one of the significant locations represented in the state model. The forecast can be based on a current time, the future time, a current location, and a probability density function determined based on the states and transitions of the state model. The system can predict that the mobile device will move to the significant location at a future time based on a past movement pattern of the mobile device.

Figure 8B:
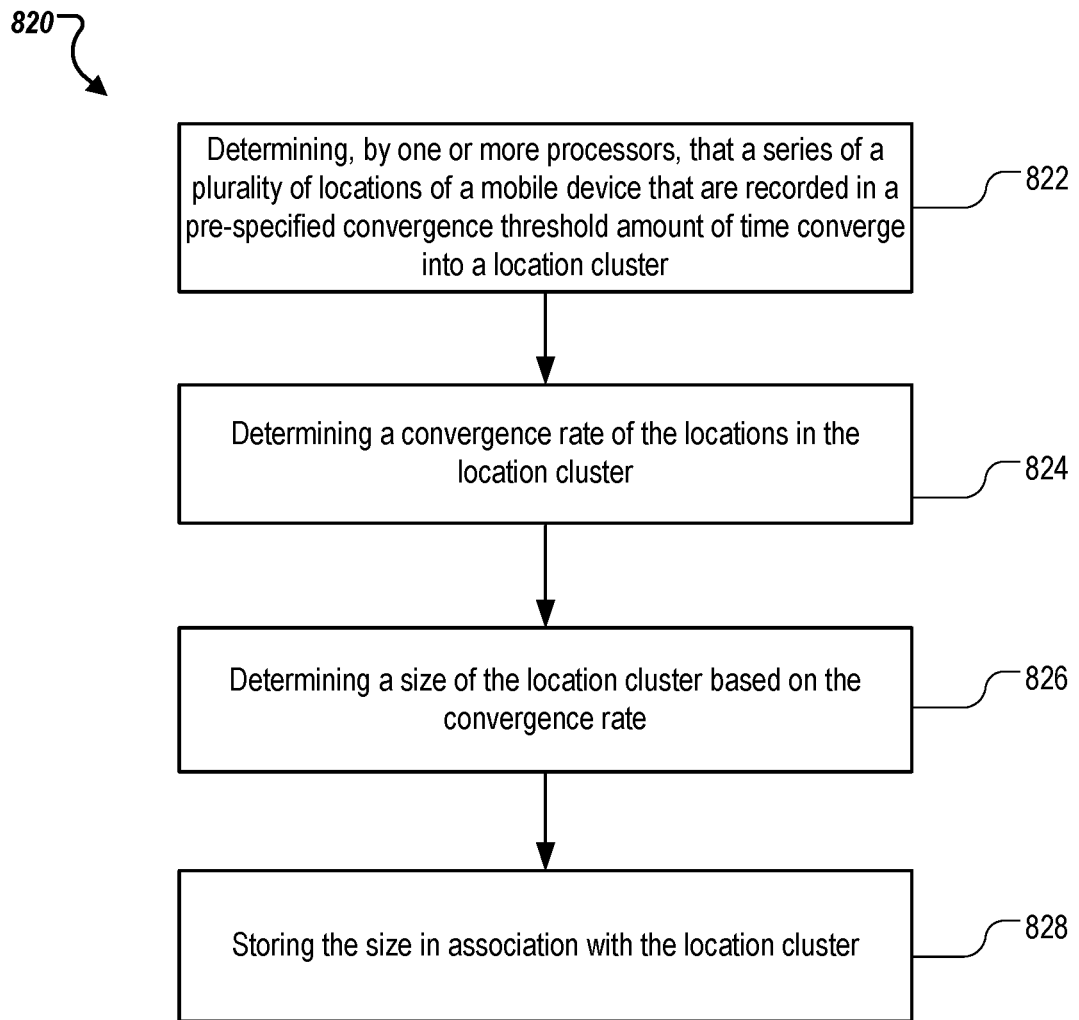
FIG. 8B is a flowchart illustrating an exemplary procedure of adaptive location clustering.

FIG. 8B is a flowchart illustrating an exemplary procedure 820 of adaptive location clustering. Procedure 820 can be performed by a system including one or more processors. The system can include mobile device 102.

The system can determine (822) that a series of locations of a mobile device that are recorded in a pre-specified convergence threshold amount of time, e.g., five hours, converge into a location cluster. The location cluster can indicate that a geographic location of the location cluster is a significant location to a user of the mobile device. The series of locations of the mobile device can be recorded during multiple time periods, e.g., 7:00-8:00 am on every weekday, where each time period is disconnected with another time period. As long as a total amount of time of the time periods, when summed up, satisfies the pre-specified convergence threshold amount of time, the system can move to the next stage of operations.

The system can determine (824) a convergence rate of the locations in the location cluster, the convergence rate indicating how quickly the locations are clustered together. Determining the convergence rate can occur real time and include determining the convergence rate using locations recorded in a present time period and each prior time period. Determining that the series of locations converge into a location cluster can include determining an initial location X[0] indicating an entry into the location cluster. The system can then receive a series of subsequent locations X[1], X[2] . . . X[n]. The system can determine whether each respective subsequent location is included in the location cluster using a statistical filter configured to filter out outliers that are too far away from locations already in the location cluster. The statistical filter can include a type of Kalman filter. The system can determine that the series of locations converge into the location cluster upon determining at least a portion of the subsequent locations are included in the location cluster. Determining the convergence rate includes determining a statistical deviation among the locations in the location cluster, e.g., by calculating a standard deviation of the locations std(X[0], X[1] . . . X[n]).

The system can determine (826) a size of the location cluster based on the convergence rate. For example, a higher convergence rate, as indicated by a smaller standard deviation, can correspond to a smaller size. After determining the size of the location cluster, the system can adjust the size according to additional locations of the mobile device. An increased convergence among the additional locations can reduce the size of the location cluster.

The system can store (828) the size in association with the location cluster. In some implementations, the system can designate the significant location as a state in a state model for estimating a place that the user is likely to move to at a future time and for providing predictive user assistance according to the estimated place. The significant location can be associated with the size of the location cluster and representable in a virtual map by a marker having a display size corresponding to the size of the location cluster. Determining the convergence rate, determining the size of the location cluster, and designating the significant location as the state in the state model can occur in real time while the mobile device determines and records locations of the mobile device. In various implementations, the system can identify a venue from map data. The venue can have a location that matches the significant location and have a size that matches the size of the location cluster. The system can snap the significant location to the venue, including designating a shape of the venue as a shape of the significant location.

Figure 8C:
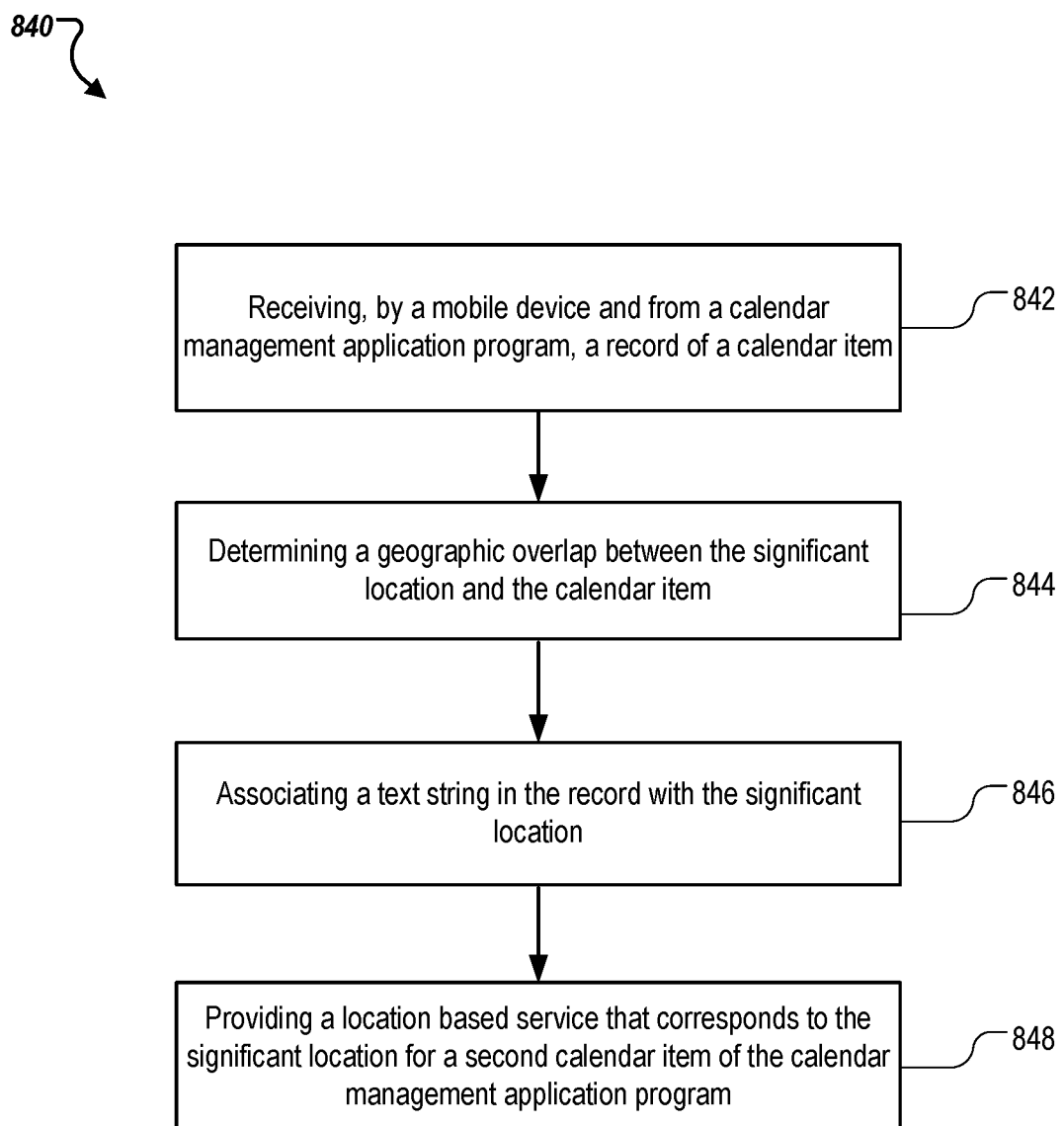
FIG. 8C is a flowchart illustrating an exemplary procedure of determining locations of calendar items.

FIG. 8C is a flowchart illustrating an exemplary procedure 840 of determining locations of calendar items. Procedure 840 can be performed by a system including one or more processors. The system can include mobile device 102.

The system can receive (842), from a calendar management application program, a record of a calendar item. The record can include a text string describing an event of the calendar item and a time specification of the event. The text string can include a subject line of the calendar item or a text body of the calendar item.

The system can determine (844) a geographic overlap between the significant location and the calendar item. Determining the geographic overlap can include determining that, at a time designated in the time specification, the mobile device dwells at a significant location of a user of the mobile device. The significant location can include a location that is estimated to have a significant meaning to the user of the mobile device. The significant location can be determined using a location cluster of the mobile device as detected from historical data. Determining that the mobile device dwells at the significant location can include determining that the mobile device is located in a location cluster for at least a threshold amount of time. The location cluster can include detected locations of the mobile device filtered by a statistical filter. In response, the system can determine the significant location based on the location cluster.

In response to determining the geographic overlap, the system can associate (846) the text string with the significant location. Associating the subject text with the significant location can include storing the text string in association with the significant location on a storage device. Associating the subject text with the significant location can include associating the subject text with the significant location in the calendar application program.

The system can provide (848) a location-based service that corresponds to the significant location for a second calendar item of the calendar management application program ahead of a time designated in a time specification of the second calendar item. The system can provide the location-based service upon determining that the second calendar item includes at least one term in the text string. Providing the location-based service can occur at a time that is determined using the time designated in the time specification of the second calendar item minus an estimated travel time from a current location to the significant location In some implementations, the location-based service can include determining that the calendar item is outside of a set of locations associated with a daily routine of the user. The daily routine can include a respective set of likelihood values that the user is located at each of the locations at various times of a day. In response to determining that the calendar item is outside of the set of locations, the system can switch a predictive user assistance model from one that is based on the daily routine (e.g., work) to one that is based on the significant location (e.g., a vacation resort in East Palo Alto, Calif.).

In some implementations, the location-based service can include determining that the user will visit the second location at the time designated in a time specification of the second calendar item. In response, the system can provide an alert to the user before the user visits the second location. For example, a mobile device can determine, based on readings of a sensor of the mobile device, a mode of transport of the mobile device, e.g., walking, biking, driving, or on public transit. The mobile device can then determine a travel time corresponding to the mode of transport, and provide the alert that corresponds to the travel time. In some implementations, the mobile device can receive motion classifiers from the mobile device or from a server indicating that the mobile device is traveling in a particular mode. The mobile device can reclassify the classifier using the mode of transport as context information. Accordingly, the mobile device can use the context information to filter out one or more motion classifiers that misclassifies a motion.

Figure 8D:
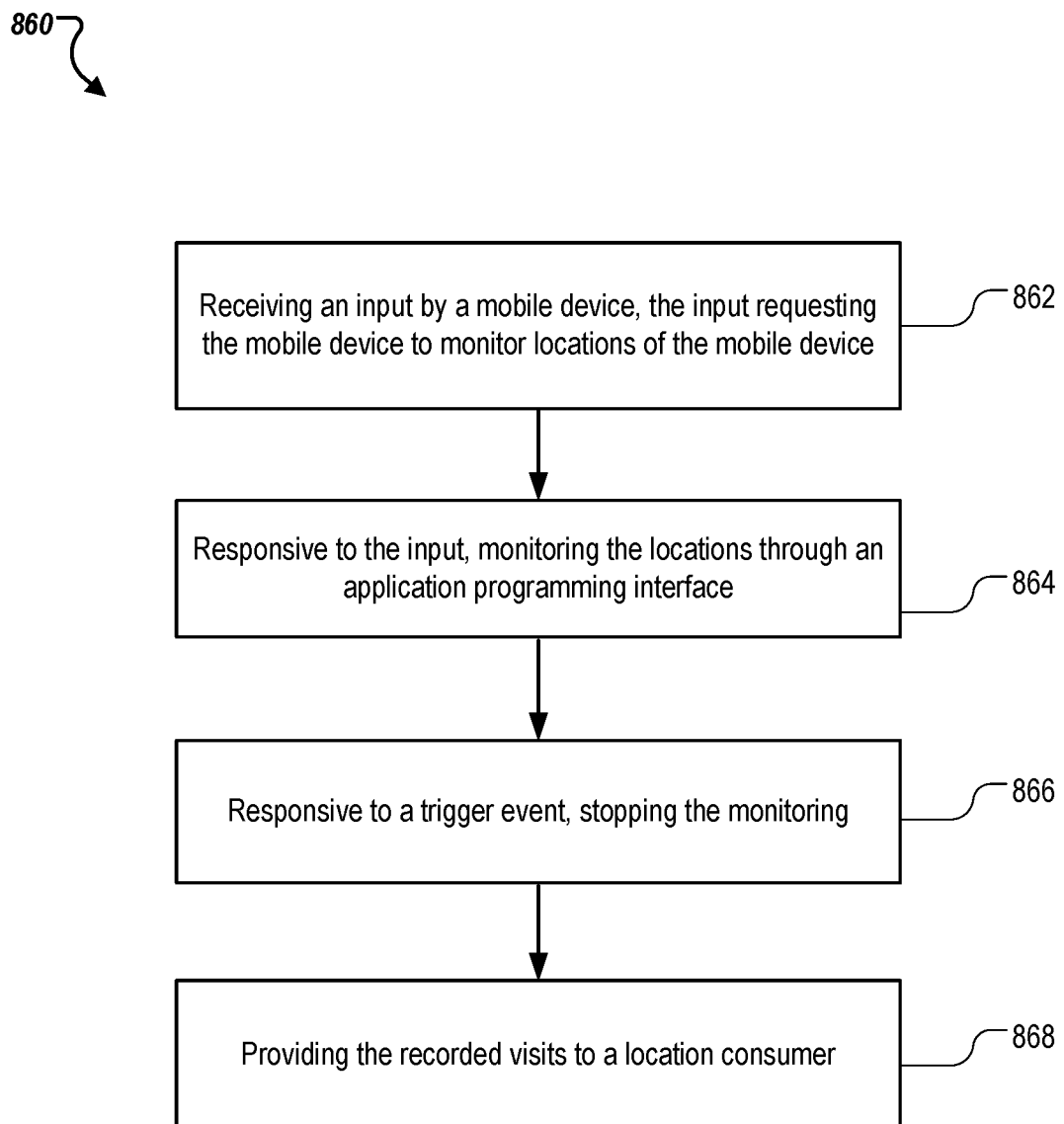
FIG. 8D is a flowchart illustrating an exemplary procedure of calling a location monitoring API.

FIG. 8D is a flowchart illustrating an exemplary procedure 860 of calling a location monitoring API. Procedure 860 can be performed by a mobile device including one or more processors. The mobile device can be mobile device 102 of FIG. 1.

The mobile device can receive (862) an input. The input can request the mobile device to monitor locations of the mobile device to determine a length of time the mobile device has dwelled at a location. The mobile device can determine that the location is a significant location for a user of the mobile device upon determining that the length of time satisfies a configurable threshold.

Responsive to the input, the mobile device can monitor (864) the locations through an API. Monitoring the locations can include calling a start-monitoring instance function, also referred to as a start-monitoring instance method, of an object of a location manager class. The start-monitoring instance function can be declared in the API and configured to perform actions of recording detected visits of the mobile device at the locations. Each detected visit can be associated with a respective set of geographic coordinates of a location that the mobile device visited. Recording the detected visits can include storing the detected visits as data objects on a storage device, or sending a visit callback to a pre-specified function to notify the pre-specified function of an aspect of a detected visit. The aspect of the detected visit can include at least one of an arrival of the mobile device at a location or a departure of the mobile device from the location.

In some implementations, each detected visit can be recorded as an object of a location visit class, the object having an arrival date attribute storing a date the visit began, a departure date attribute storing a date the visit ended, a coordinate attribute storing geographic coordinates of a center of a region visited by the mobile device, and a horizontal accuracy attribute storing an estimated radius of the region visited. The object of the location visit class can be specified in a class declaration to conform to a secure coding protocol and a copying protocol, each of the secure coding protocol and copying protocol defining a manner that the object sends a message to another object.

Responsive to a trigger event, the mobile device can stop (866) the monitoring. Stopping the monitoring can include calling a stop-monitoring instance function, also referred to as a stop-monitoring instance method, of the object. The stop-monitoring instance function can be declared in the API and being operable to stop the object of the location manager class to record the visits. The trigger event can include a user input, a timeout event, or an interruption event.

Each of the start-monitoring instance function and the stop-monitoring instance function can be an asynchronous function that, once called, performs their respective operations without requiring a caller to wait for a result before performing other actions. Each of the start-monitoring instance function and the stop-monitoring instance function is associated with a compiler hint in the API. The compiler hint indicating a compatible version of an operating system for the API.

The mobile device can provide (868) the recorded visits to location consumer. The location consumer can be a significant location determination engine for determining location coordinates of the significant location and a size of the significant location using the sets of geographic coordinates in the recorded visits.

The API can be defined in an object oriented programming language, e.g., Objective-C or C++ programming language in a header file. The start-monitoring instance function can declared in the API as having a name of startMonitoringVisits and a void type. The stop-monitoring instance function can be declared in the API as having a name of stopMonitoringVisits and a void type. Each name of the respective instance function is indicative of underlying operations of the respective function to a developer programming using the API. Pseudo code for the API is provided below in Listing 1.

Listing 1: Location API

```
@interface LocationManager (LocationVisitExtensions)
/* startMonitoringVisits
* Begin monitoring for visits. All LocationManagers allocated by an
* application can deliver detected visits to their delegates. The delivery
can
* continue until-stopMonitoringVisits is sent to any such LocationMan-
ager,
* even across application re-launch events.
* Detected visits can be sent to the delegate's-locationManager:didVisit:
* method. */
-(void) startMonitoringVisits COMPILER_HINT(OS_VERSION);
/* stopMonitoringVisits
* Stop monitoring for visits. To resume visit monitoring, send
*-startMonitoringVisits.
* Stopping and starting can be asynchronous operations and may or
* may not immediately reflect in delegate callback patterns. */
-(void) stopMonitoringVisits COMPILER_HINT(OS_VERSION);
@end
/* LocationVisit
* An instance of this class can represent a possibly open-ended event
* during which a mobile device was at a specified coordinate. */
COMPILER_HINT(OS_VERSION)
@interface LocationVisit: Object <SecureCoding, Copying>
/* arrivalDate-A date, including time, when the visit began. This value
* may equal to [Date_Distant_Past] if the true arrival date is not available.
*/ @property (nonatomic, readonly, copy) Date *arrivalDate;
/* departureDate-A date when the visit ended. This value may equal to
* [Date_Distant_Future] if the mobile device has not left a location yet. */
@property (nonatomic, readonly, copy) Date *departureDate;
/*coordinate-A center of a region which the mobile device is visiting. */
@property (nonatomic) LocationCoordinate2D coordinate;
/* horizontalAccuracy-An estimate of a radius, e.g., in meters of the
region
which the mobile device is visiting. */
@property (nonatomic) CLLocationAccuracy horizontalAccuracy; @end
```

Figure 9:
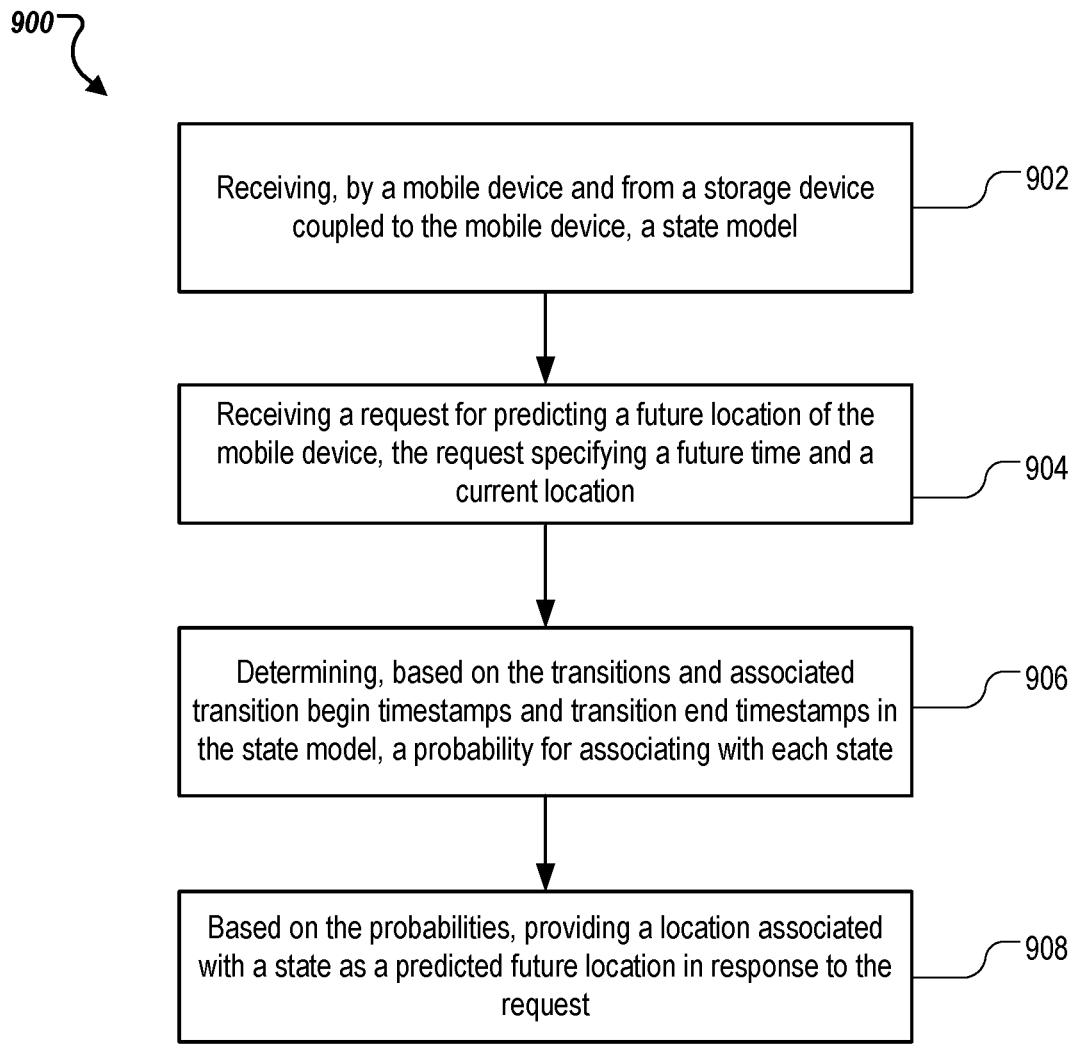
FIG. 9 is a flowchart illustrating an exemplary procedure of predicting a future location.

FIG. 9 is a flowchart illustrating exemplary procedure 900 of predicting a future location. Procedure 900 can be performed by mobile device 102, for example, using forecasting subsystem 710 of mobile device 102.

Mobile device 102 can receive (902), from a storage device (e.g., state model database 708) coupled to mobile device 102, a state model. The state model can include multiple states and transitions between the states. Each state can correspond to a location. Each transition from a first state to a second state can indicate that, in the past, mobile device 102 moved from a corresponding first location to a corresponding second location. Each location and transition can be associated with one or more timestamps.

Mobile device 102 can receive (904), from an application program or a device, a request for predicting a future location of mobile device 102. The request can specify a future time and, optionally, a current location of mobile device 102. The future time can include a point in time in the future or a time window in the future.

Mobile device 102 can determine (906), using a current time, the future time, and a current location of the mobile device as inputs, a probability for associating with each state in the state model. If the request does not include the current location, mobile device 102 can determine the current location using location determination subsystem 704. Mobile device 102 can determine the probabilities based on the states, transitions, and associating timestamps. The probabilities can indicate a likelihood that mobile device 102 will be located at each respective location corresponding to a state at the future time.

Determining (906) the probability for associating with each state can include determining that the current location is in state, where the current location is represented as a state in the state model. Determining the probability for each state can include determining a transition probability density of mobile device 102 moving from the state representing current location to a location corresponding to the state in one or more transitions. The transition probability density can satisfy properties of a Markov process. Determining the transition probability density can be based on the transitions between states and a transition begin timestamp and a transition end timestamp associated with each of the transitions.

Determining (906) the probability for associating with each state can include determining that the current location is out of state, where the current location is not represented as a state in the state model. Determining the probability to be associated with each state can include determining an entry probability density of mobile device 102 entering a location corresponding to each state from the out-of-state current location. Determining the entry probability density can be based on a dwell time mobile device 102 is in each state. Mobile device 102 can determine the dwell time based on one or more entry timestamps and one or more exit timestamps associated with the respective state.

In some implementations, determining (906) the probability for associating with each state can be based on a daily, weekly, monthly, or annual pattern. Mobile device 102 can determine whether the state model satisfies a longevity threshold (e.g., X weeks). Mobile device 102 can determine a first activity pattern upon determining the state model satisfies the longevity threshold. The first activity pattern can correspond to a first time span (e.g., a week). Alternatively, mobile device 102 can determine a second activity pattern upon determining that the state model does not satisfy the longevity threshold. The second activity pattern can correspond to a second time span (e.g., a day). The first time span can be longer than the second time span. Mobile device 102 can determine the probability based on the current time, the future time, and the first activity pattern or second activity pattern. Mobile device 102 can then determine the probability for associating with each state based on the current time, the future time, and the first activity pattern or second activity pattern.

In some implementations, mobile device 102 can filter the states in the state model based on a distance between the current location and each location represented in the state model and a difference between the current time and the future time. Mobile device 102 can filter out the states that, given the difference in time, and given a moving speed of mobile device 102, a likelihood that mobile device 102 reaches the state from the current location falls below a threshold value.

Based on the probabilities, mobile device 102 can provide (908) at least one location associated with a state as a predicted future location of mobile device 102 in response to the request. In some implementations, providing the location as the predicted future location can include identifying a state associated with a highest probability, and designating the location associated with the state associated with the highest probability as the predicted future location. In some implementations, providing the location as the predicted future location can include ranking the states based on the probabilities and one or more forecast attributes, and designating the location associated with a highest rank as the predicted future location.

The forecast attributes can include a time of last visit to each corresponding location. The forecast attributes can include a derived likelihood for a forecast window based on the current location, the current time, and a forecast window length. The forecast attributes can include a temporal length of the state model. The forecast attributes can include an aggregated dwell time at each state. The forecast attributes can include a number of visits at each state.

In some implementations, mobile device 102 can determine that a data density of the state model satisfies a sparse model threshold. In response, mobile device 102 can determine the probability for associating with each state in a sparse operating mode. In the sparse operating mode, probability density calculations and rankings can be performed in a less stringent matter than the calculations and rankings in normal operating mode.

Exemplary Mobile Device Architecture

Figure 10:
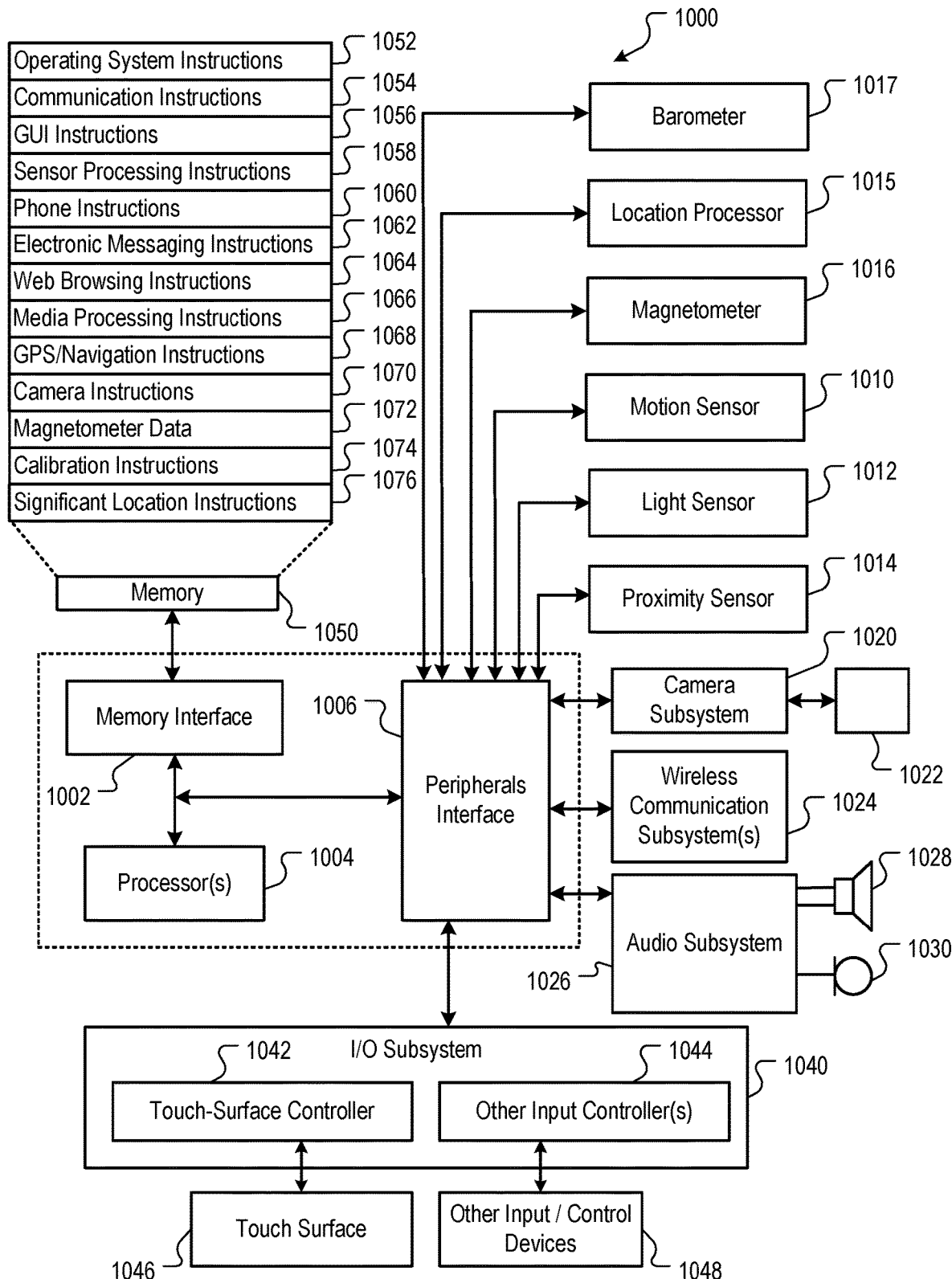
FIG. 10 is a block diagram illustrating an exemplary device architecture of a mobile device implementing the features and operations of FIGS. 1-9.

FIG. 10 is a block diagram illustrating exemplary device architecture 1000 of a mobile device implementing the features and operations of category-based geofence. A mobile device (e.g., mobile device 102) can include memory interface 1002, one or more data processors, image processors and/or processors 1004, and peripherals interface 1006. Memory interface 1002, one or more processors 1004 and/or peripherals interface 1006 can be separate components or can be integrated in one or more integrated circuits. Processors 1004 can include application processors, baseband processors, and wireless processors. The various components in mobile device 102, for example, can be coupled by one or more communication buses or signal lines.

Sensors, devices, and subsystems can be coupled to peripherals interface 1006 to facilitate multiple functionalities. For example, motion sensor 1010, light sensor 1012, and proximity sensor 1014 can be coupled to peripherals interface 1006 to facilitate orientation, lighting, and proximity functions of the mobile device. Location processor 1015 (e.g., GPS receiver) can be connected to peripherals interface 1006 to provide geopositioning. Electronic magnetometer 1016 (e.g., an integrated circuit chip) can also be connected to peripherals interface 1006 to provide data that can be used to determine the direction of magnetic North. Thus, electronic magnetometer 1016 can be used as an electronic compass. Motion sensor 1010 can include one or more accelerometers configured to determine change of speed and direction of movement of the mobile device. Barometer 1017 can include one or more devices connected to peripherals interface 1006 and configured to measure pressure of atmosphere around the mobile device.

Camera subsystem 1020 and an optical sensor 1022, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1024, which can include radio frequency receivers and transmitters and/or optical (e.g., infrared) receivers and transmitters. The specific design and implementation of the communication subsystem 1024 can depend on the communication network(s) over which a mobile device is intended to operate. For example, a mobile device can include communication subsystems 1024 designed to operate over a GSM network, a GPRS network, an EDGE network, a Wi-Fi™ or WiMAX™ network, and a Bluetooth™ network. In particular, the wireless communication subsystems 1024 can include hosting protocols such that the mobile device can be configured as a base station for other wireless devices.

Audio subsystem 1026 can be coupled to a speaker 1028 and a microphone 1030 to facilitate voice-enabled functions, such as voice recognition, voice replication, digital recording, and telephony functions. Audio subsystem 1026 can be configured to receive voice commands from the user.

I/O subsystem 1040 can include touch surface controller 1042 and/or other input controller(s) 1044. Touch surface controller 1042 can be coupled to a touch surface 1046 or pad. Touch surface 1046 and touch surface controller 1042 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch surface 1046. Touch surface 1046 can include, for example, a touch screen.

Other input controller(s) 1044 can be coupled to other input/control devices 1048, such as one or more buttons, rocker switches, thumb-wheel, infrared port, USB port, and/or a pointer device such as a stylus. The one or more buttons (not shown) can include an up/down button for volume control of speaker 1028 and/or microphone 1030.

In one implementation, a pressing of the button for a first duration may disengage a lock of the touch surface 1046; and a pressing of the button for a second duration that is longer than the first duration may turn power to mobile device 102 on or off. The user may be able to customize a functionality of one or more of the buttons. The touch surface 1046 can, for example, also be used to implement virtual or soft buttons and/or a keyboard.

In some implementations, mobile device 102 can present recorded audio and/or video files, such as MP3, AAC, and MPEG files. In some implementations, mobile device 102 can include the functionality of an MP3 player. Mobile device 102 may, therefore, include a pin connector that is compatible with the iPod. Other input/output and control devices can also be used.

Memory interface 1002 can be coupled to memory 1050. Memory 1050 can include high-speed random access memory and/or non-volatile memory, such as one or more magnetic disk storage devices, one or more optical storage devices, and/or flash memory (e.g., NAND, NOR). Memory 1050 can store operating system 1052, such as Darwin, RTXC, LINUX, UNIX, OS X, WINDOWS, iOS, or an embedded operating system such as VxWorks. Operating system 1052 may include instructions for handling basic system services and for performing hardware dependent tasks. In some implementations, operating system 1052 can include a kernel (e.g., UNIX kernel).

Memory 1050 may also store communication instructions 1054 to facilitate communicating with one or more additional devices, one or more computers and/or one or more servers. Memory 1050 may include graphical user interface instructions 1056 to facilitate graphic user interface processing; sensor processing instructions 1058 to facilitate sensor-related processing and functions; phone instructions 1060 to facilitate phone-related processes and functions; electronic messaging instructions 1062 to facilitate electronic-messaging related processes and functions; web browsing instructions 1064 to facilitate web browsing-related processes and functions; media processing instructions 1066 to facilitate media processing-related processes and functions; GPS/Navigation instructions 1068 to facilitate GPS and navigation-related processes and instructions; camera instructions 1070 to facilitate camera-related processes and functions; magnetometer data 1072 and calibration instructions 1074 to facilitate magnetometer calibration. The memory 1050 may also store other software instructions (not shown), such as security instructions, web video instructions to facilitate web video-related processes and functions, and/or web shopping instructions to facilitate web shopping-related processes and functions. In some implementations, the media processing instructions 1066 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 1050. Memory 1050 can store significant location instructions 1076 that include modeling instructions and forecasting instructions. The modeling instructions, upon execution, can cause processor 1004 to perform the operations of state model determination subsystem 702, including procedure 800. The forecasting instructions, upon execution, can cause processor 1004 to perform the operations of forecasting subsystem 710. The operations can include procedure 900.

Each of the above identified instructions and applications can correspond to a set of instructions for performing one or more functions described above. These instructions need not be implemented as separate software programs, procedures, or modules. Memory 1050 can include additional instructions or fewer instructions. Furthermore, various functions of the mobile device may be implemented in hardware and/or in software, including in one or more signal processing and/or application specific integrated circuits.

Exemplary Operating Environment

Figure 11:
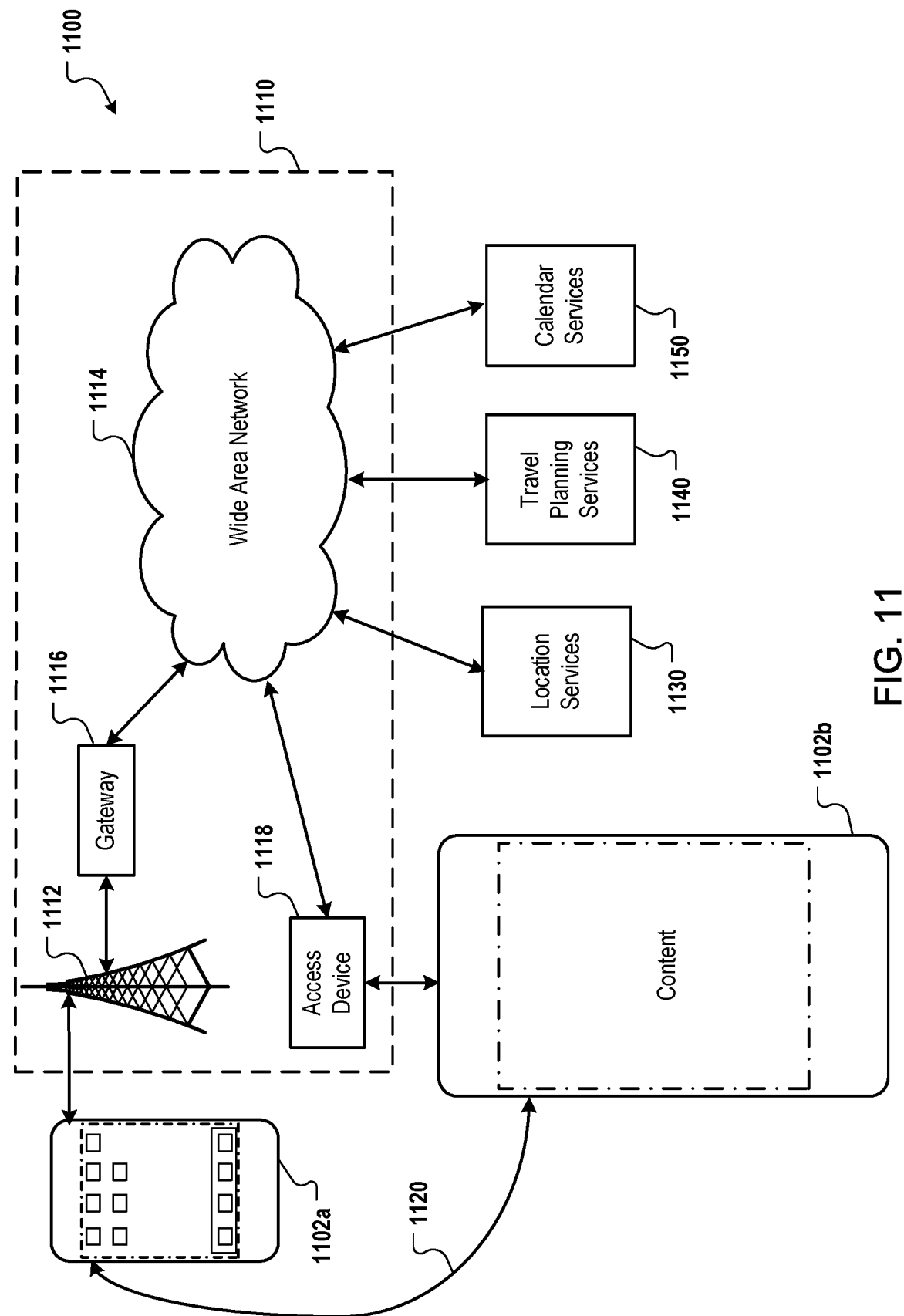
FIG. 11 is a block diagram of an exemplary network operating environment for the mobile devices implementing the features and operations of FIGS. 1-9.

FIG. 11 is a block diagram of exemplary network operating environment 1100 for the mobile devices implementing the features and operations of category-based geofence. Mobile devices 1102a and 1102b can, for example, communicate over one or more wired and/or wireless networks 1110 in data communication. For example, a wireless network 1112, e.g., a cellular network, can communicate with a wide area network (WAN) 1114, such as the Internet, by use of a gateway 1116. Likewise, an access device 1118, such as an 802.11g wireless access point, can provide communication access to the wide area network 1114. Each of mobile devices 1102a and 1102b can be mobile device 102.

In some implementations, both voice and data communications can be established over wireless network 1112 and the access device 1118. For example, mobile device 1102a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 1112, gateway 1116, and wide area network 1114 (e.g., using Transmission Control Protocol/Internet Protocol (TCP/IP) or User Datagram Protocol (UDP)). Likewise, in some implementations, the mobile device 1102b can place and receive phone calls, send and receive e-mail messages, and retrieve electronic documents over the access device 1118 and the wide area network 1114. In some implementations, mobile device 1102a or 1102b can be physically connected to the access device 1118 using one or more cables and the access device 1118 can be a personal computer. In this configuration, mobile device 1102a or 1102b can be referred to as a "tethered" device.

Mobile devices 1102a and 1102b can also establish communications by other means. For example, wireless device 1102a can communicate with other wireless devices, e.g., other mobile devices, cell phones, etc., over the wireless network 1112. Likewise, mobile devices 1102a and 1102b can establish peer-to-peer communications 1120, e.g., a personal area network, by use of one or more communication subsystems, such as the Bluetooth™ communication devices. Other communication protocols and topologies can also be implemented.

Mobile device 1102a or 1102b can, for example, communicate with one or more services 1130, 1140, and 1150 over the one or more wired and/or wireless networks. For example, one or more location services 1130 can provide location data associated with cellular towers or wireless access gateways to mobile devices 1102a and 1102b such that mobile device 1102a and 1102b can determine a current location using triangulation. Location service 1130 can receive a series of current locations from mobile devices 1102a or 1102b and determine a significant location for mobile devices 1102a or 1102b or both, based on hints and based on adaptive location clustering technologies. Travel planning services 1140 can provide traffic information based on a current time, current location, and a forecast location to assist a user planning a route to the forecast location and an estimated time of arrival. Calendar services 1150 can store, on a user's storage space, the user's calendar items and their respective locations for access by multiple user devices of a same user.

Mobile device 1102a or 1102b can also access other data and content over the one or more wired and/or wireless networks. For example, content publishers, such as news sites, Really Simple Syndication (RSS) feeds, web sites, blogs, social networking sites, developer networks, etc., can be accessed by mobile device 1102a or 1102b. Such access can be provided by invocation of a web browsing function or application (e.g., a browser) in response to a user touching, for example, a Web object.

As described above, some aspects of the subject matter of this specification include gathering and use of data available from various sources to improve services a mobile device can provide to a user. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

A number of implementations of the subject matter have been described. Nevertheless, it will be understood that various modifications can be made without departing from the spirit and scope of the subject matter.

What is claimed is:

1. A method comprising:

determining, by a mobile device, for a set of states within a state model stored by the mobile device, a probability for each state in the set of states, the state model comprising a plurality of states and transitions between the states, states of the state model correspond with locations, and a transition from a first state to a second state indicates that the mobile device moved from a corresponding first location to a corresponding second location, wherein states and transitions are associated with a one or more timestamps, and determining the probability for each state in the set of states comprises determining a transition probability associated with the mobile device;

corresponding to a transition between each state in the set of states;

receiving, by the mobile device, a request for predicting a future location of the mobile device, the request specifying a future time; and in response to the request, providing a predicted future location of the mobile device for the future time specified in the request, the predicted future location determined for the future time based on the probability determined by the mobile device for each state in the set of states.

2. The method as in claim 1, wherein the states within the state model correspond with locations previously visited by the mobile device.

3. The method as in claim 1, wherein each state in the set of states corresponds to a geographic location determined to be a significant location, wherein a significant location is a location where the mobile device has dwelled for at least a threshold period of time.

4. The method as in claim 1, wherein determining the transition probability associated with the mobile device includes determining a probability density function based on the states and transitions of the state model.

5. The method as in claim 4, wherein the predicted future location is determined via the probability density function based on a current time and a current location of the mobile device, wherein the request for predicting the future location of the mobile device includes the current location of the mobile device or the mobile device determines the current location in response to the request.

6. The method as in claim 4, wherein determining the probability for each state includes determining that the current location is not represented as a state in the state model and determining the transition probability associated with the mobile device based on entry probability densities of entering a state of the state model from the current location.

7. The method as in claim 4, wherein determining the transition probability associated with the mobile device includes filtering the states in the state model based on a distance between the current time and the future time and the distance between a current location and the location of the states in the state model.

8. The method as in claim 1, wherein the future time of the request includes a future time window.

9. The method as in claim 7, wherein providing the predicted future location of the mobile device includes providing one or more predicted future locations within the future time window.

10. A data processing system associated with a mobile device, the system comprising:

a memory device; and one or more processors to execute instructions stored in the memory device, wherein the one or more processors perform operations to:

determine, for a set of states within a state model stored by the mobile device, a probability for each state in the set of states, the state model comprising a plurality of states and transitions between the states, states of the state model correspond with locations, and a transition from a first state to a second state indicates that the mobile device moved from a corresponding first location to a corresponding second location, wherein states and transitions are associated with a one or more timestamps, and to determine the probability for each state in the set of states includes to determine a transition probability associated with the mobile device;

receive, by the mobile device, a request for predicting a future location of the mobile device, wherein the request specifies a future time; and in response to the request, provide a predicted future location of the mobile device for the future time specified in the request, the predicted future location determined for the future time based on the probability determined by the mobile device for each state in the set of states.

11. The data processing system as in claim 10, wherein the states within the state model correspond with locations previously visited by the mobile device and each state in the set of states corresponds to a geographic location determined to be a significant location, wherein a significant location is a location where the mobile device has dwelled for at least a threshold period of time.

12. The data processing system as in claim 11, wherein the predicted future location is additionally determined based on a current time and a current location of the mobile device, wherein the request for predicting the future location of the mobile device includes the current location of the mobile device or the mobile device determines the current location in response to the request.

13. The data processing system as in claim 12, wherein to determine the probability for each state includes to determine that the current location is not represented as a state in the state model and determine the transition probability associated with the mobile device based on entry probability densities of entering a state of the state model from the current location, wherein to determine the transition probability associated with the mobile device includes to filter the states in the state model based on a distance between the current time and the future time and the distance between a current location and the location of the states in the state model.

14. The data processing system as in claim 10, wherein the future time of the request includes a future time window and to provide the predicted future location of the mobile device includes to provide one or more predicted future locations within the future time window.

15. A non-transitory machine-readable medium storing instructions which, when executed by one or more processors of a mobile device, cause the one or more processors to perform operations comprising:

determining, by a mobile device, for a set of states within a state model stored by the mobile device, a probability for each state in the set of states, the state model comprising a plurality of states and transitions between the states, states of the state model correspond with locations, and a transition from a first state to a second state indicates that the mobile device moved from a corresponding first location to a corresponding second location, wherein states and transitions are associated with a one or more timestamps, and determining the probability for each state in the set of states comprises determining a transition probability associated with the mobile device;

corresponding to a transition between each state in the set of states;

receiving, by the mobile device, a request for predicting a future location of the mobile device, the request specifying a future time; and in response to the request, providing a predicted future location of the mobile device for the future time specified in the request, the predicted future location determined for the future time based on the probability determined by the mobile device for each state in the set of states.

16. The non-transitory machine-readable medium as in claim 15, wherein the states within the state model correspond with locations previously visited by the mobile device.

17. The non-transitory machine-readable medium as in claim 16, wherein each state in the set of states corresponds to a geographic location determined to be a significant location, wherein a significant location is a location where the mobile device has dwelled for at least a threshold period of time.

18. The non-transitory machine-readable medium as in claim 15, wherein determining the transition probability associated with the mobile device includes determining a probability density function based on the states and transitions of the state model.

19. The non-transitory machine-readable medium as in claim 18, wherein the predicted future location is determined via the probability density function based on a current time and a current location of the mobile device, wherein the request for predicting the future location of the mobile device includes the current location of the mobile device or the mobile device determines the current location in response to the request.

20. The non-transitory machine-readable medium as in claim 19, wherein determining the probability for each state includes determining that the current location is not represented as a state in the state model and determining the transition probability associated with the mobile device based on entry probability densities of entering a state of the state model from the current location, wherein determining the transition probability associated with the mobile device includes filtering the states in the state model based on a distance between the current time and the future time and the distance between a current location and the location of the states in the state model.

* * * * *